United States Patent
Lenker et al.

(10) Patent No.: US 12,440,287 B2
(45) Date of Patent: Oct. 14, 2025

(54) ROBOTICALLY CONTROLLED STEERABLE ACCESS SYSTEM AND METHOD OF USE

(71) Applicant: Indian Wells Medical, Inc., Lake Forest, CA (US)

(72) Inventors: Jay Alan Lenker, Lake Forest, CA (US); James Alexander Carroll, Long Beach, CA (US); Eugene Michael Breznock, Winters, CA (US)

(73) Assignee: Indian Wells Medical, Inc., Lake Forest, CA (US)

( * ) Notice: Subject to any disclaimer, the term of this patent is extended or adjusted under 35 U.S.C. 154(b) by 393 days.

(21) Appl. No.: 17/949,210

(22) Filed: Sep. 21, 2022

(65) Prior Publication Data

US 2023/0107208 A1    Apr. 6, 2023

Related U.S. Application Data

(60) Provisional application No. 63/247,741, filed on Sep. 23, 2021.

(51) Int. Cl.
*A61B 34/30* (2016.01)
*A61B 34/00* (2016.01)

(52) U.S. Cl.
CPC ............ *A61B 34/30* (2016.02); *A61B 34/76* (2016.02); *A61B 2034/301* (2016.02); *A61B 2034/303* (2016.02)

(58) Field of Classification Search
CPC ... A61B 34/30; A61B 34/76; A61B 2034/301; A61B 2034/303; A61B 2017/00247; A61B 2017/00309; A61B 2017/00336; A61B 2017/00557; A61B 2018/00577; A61B 2018/00601; A61B 2090/033; A61B 17/32053; A61B 17/3478; A61B 18/1492; A61B 2090/374; A61B 2090/376; A61B 2090/378; A61B 2090/395; A61B 2090/3966
See application file for complete search history.

(56) References Cited

U.S. PATENT DOCUMENTS 3,802,440 A    4/1974  Salem
4,757,827 A    7/1988  Buchbinder et al.
(Continued)

FOREIGN PATENT DOCUMENTS

EP    1898801       3/2008
JP    2004508147    3/2004
(Continued)

OTHER PUBLICATIONS

Examiner's Report and Examination Search Report from Canadian Patent Application No. 2,870,854 dated Nov. 7, 2019.
(Continued)

*Primary Examiner* — Navin Natnithithadha
(74) *Attorney, Agent, or Firm* — Crockett & Crockett, PC; K. David Crockett, Esq.

(57) ABSTRACT

An endoluminal traversing system and tissue crossing system are described wherein the access systems are controlled by actuators that allow for robotic control of system functions. The robotic system can be configured for full manual control over the actuators, full computerized control, or a combination of human and computer (AI, neural net, rule set) guidance.

4 Claims, 16 Drawing Sheets

(56) References Cited

U.S. PATENT DOCUMENTS

| | | | |
|---|---|---|---|
| 4,815,478 A | 3/1989 | Buchbinder et al. | |
| 4,953,553 A * | 9/1990 | Tremulis | A61B 5/0215 604/528 |
| 5,228,441 A | 7/1993 | Lundquist | |
| 5,725,512 A | 3/1998 | Swartz et al. | |
| 6,136,016 A | 10/2000 | Barbut et al. | |
| 6,217,527 B1 | 4/2001 | Selmon et al. | |
| 6,419,641 B1 | 7/2002 | Mark et al. | |
| 6,650,923 B1 | 11/2003 | Lesh | |
| 6,685,679 B2 | 2/2004 | Merdan | |
| 6,695,814 B2 | 2/2004 | Greene et al. | |
| 7,471,697 B2 | 12/2008 | Kamiya | |
| 7,488,448 B2 | 2/2009 | Wieting et al. | |
| 7,615,044 B2 | 11/2009 | Scheibe | |
| 7,632,277 B2 | 12/2009 | Woll | |
| 7,678,081 B2 | 3/2010 | Whiting et al. | |
| 7,824,356 B2 | 11/2010 | Wieting et al. | |
| 7,935,102 B2 | 5/2011 | Breznock et al. | |
| 8,235,943 B2 | 8/2012 | Breznock et al. | |
| 8,323,241 B2 | 12/2012 | Salahieh et al. | |
| 8,480,606 B2 | 7/2013 | Wieting et al. | |
| 8,491,619 B2 | 7/2013 | Breznock | |
| 8,932,276 B1 * | 1/2015 | Morriss | A61B 17/1657 604/528 |
| 8,939,926 B2 | 1/2015 | Wieting et al. | |
| 8,961,550 B2 | 2/2015 | Lenker et al. | |
| 9,445,836 B2 | 9/2016 | Breznock | |
| 9,555,182 B2 | 1/2017 | Wieting et al. | |
| 9,707,007 B2 | 7/2017 | Lenker et al. | |
| 9,993,266 B2 | 6/2018 | Lenker et al. | |
| 10,016,210 B2 | 7/2018 | Lenker et al. | |
| 10,016,221 B2 | 7/2018 | Lenker et al. | |
| 10,034,686 B2 | 7/2018 | Breznock | |
| 10,369,265 B2 | 8/2019 | Wieting et al. | |
| 10,485,569 B2 | 11/2019 | Lenker et al. | |
| 10,485,579 B2 | 11/2019 | Lenker | |
| 10,729,457 B2 | 8/2020 | Lenker et al. | |
| 10,779,858 B2 | 9/2020 | Lenker et al. | |
| 10,786,655 B2 | 9/2020 | Lenker | |
| 10,806,483 B2 | 10/2020 | Breznock | |
| 10,932,815 B1 | 3/2021 | Lenker et al. | |
| 11,090,080 B2 | 8/2021 | Lenker et al. | |
| 11,234,728 B2 | 2/2022 | Lenker et al. | |
| 11,317,938 B2 | 5/2022 | Lenker et al. | |
| 11,382,654 B2 | 7/2022 | Lenker | |
| 11,490,922 B2 | 11/2022 | Lenker et al. | |
| 11,648,025 B1 | 5/2023 | Lenker | |
| 11,771,463 B2 | 10/2023 | Lenker | |
| 11,786,265 B1 | 10/2023 | Lenker | |
| 11,819,642 B2 | 11/2023 | Lenker | |
| 11,839,401 B2 | 12/2023 | Lenker | |
| 11,844,548 B1 | 12/2023 | Lenker | |
| 11,871,960 B2 | 1/2024 | Lenker | |
| 11,911,066 B2 | 2/2024 | Lenker | |
| 11,986,202 B2 | 5/2024 | Lenker | |
| 12,156,675 B2 | 12/2024 | Lenker et al. | |
| 2002/0087166 A1 * | 7/2002 | Brock | A61B 34/71 606/130 |
| 2004/0193073 A1 | 9/2004 | DeMello et al. | |
| 2004/0267361 A1 | 12/2004 | Donnelly et al. | |
| 2005/0004515 A1 | 1/2005 | Hart et al. | |
| 2005/0101984 A1 | 5/2005 | Chanduszko et al. | |
| 2005/0267495 A1 | 12/2005 | Ginn et al. | |
| 2006/0074442 A1 | 4/2006 | Noriega et al. | |
| 2006/0252984 A1 | 11/2006 | Rahdert | |
| 2007/0060878 A1 | 3/2007 | Bonnette et al. | |
| 2007/0250074 A1 * | 10/2007 | Brock | A61B 34/70 606/130 |
| 2008/0045863 A1 | 2/2008 | Bakos | |
| 2008/0045908 A1 | 2/2008 | Gould et al. | |
| 2008/0200980 A1 | 8/2008 | Robin | |
| 2008/0243081 A1 | 10/2008 | Nance | |
| 2009/0036832 A1 | 2/2009 | Skujins et al. | |
| 2010/0185053 A1 | 7/2010 | Hagen | |
| 2010/0228276 A1 | 9/2010 | Breznock | |
| 2011/0163146 A1 * | 7/2011 | Ortiz | A61B 34/72 227/175.1 |
| 2011/0184390 A1 | 7/2011 | Zanni | |
| 2011/0245615 A1 | 10/2011 | Iwasake et al. | |
| 2011/0245800 A1 | 10/2011 | Kassab et al. | |
| 2011/0295242 A1 * | 12/2011 | Spivey | A61B 17/320016 606/1 |
| 2011/0319905 A1 | 12/2011 | Palme et al. | |
| 2012/0095434 A1 | 4/2012 | Fung | |
| 2012/0130400 A1 * | 5/2012 | Brock | A61B 34/71 606/130 |
| 2014/0343538 A1 | 11/2014 | Lenker et al. | |
| 2015/0320437 A1 | 11/2015 | Worrell et al. | |
| 2016/0100860 A1 * | 4/2016 | Lenker | A61B 17/3478 604/95.01 |
| 2016/0235431 A1 | 8/2016 | Brown | |
| 2016/0346519 A1 | 12/2016 | Bagwell | |
| 2017/0105746 A1 | 4/2017 | O'Keefe et al. | |
| 2017/0245885 A1 * | 8/2017 | Lenker | A61B 17/3478 |
| 2017/0259041 A1 | 9/2017 | Lenker | |
| 2018/0289388 A1 * | 10/2018 | Lenker | A61B 18/1477 |
| 2018/0317949 A1 | 11/2018 | Lenker et al. | |
| 2019/0008557 A1 | 1/2019 | Lenker et al. | |
| 2019/0029750 A1 | 1/2019 | Maini | |
| 2020/0163694 A1 | 5/2020 | Lenker | |
| 2020/0246046 A1 | 8/2020 | Gammie | |
| 2020/0367924 A1 * | 11/2020 | Lenker | A61B 17/32053 |
| 2021/0008353 A1 * | 1/2021 | Lenker | A61M 25/09025 |
| 2021/0068620 A1 | 3/2021 | Walen et al. | |
| 2021/0353325 A1 | 11/2021 | Fagan et al. | |
| 2021/0378648 A1 | 12/2021 | Thissen et al. | |
| 2022/0339437 A1 | 10/2022 | Sorajja | |
| 2022/0370121 A1 | 11/2022 | Highsmith | |

FOREIGN PATENT DOCUMENTS

| | | |
|---|---|---|
| WO | WO9513752 | 5/1995 |
| WO | WO0064525 | 11/2000 |
| WO | WO2007-035497 | 3/2007 |
| WO | WO2007-115314 | 10/2007 |
| WO | WO2008069772 | 6/2008 |
| WO | WO2009112060 | 9/2009 |
| WO | WO2010151698 | 12/2010 |

OTHER PUBLICATIONS

Office Action dated Jul. 19, 2018 from European Patent Application No. 13861154.6.

International Search Report dated Jul. 18, 2013 from PCT Application PCT/US2013/034474.

Search Report dated May 16, 2013 from GB Application GB1308015.5.

International Search Report dated Mar. 6, 2014 from PCT Application PCT/US2013/073262.

Extended European Search Report dated Aug. 4, 2015 from EP Application 13778011.0.

Extended European Search Report dated Jun. 16, 2016 from European Patent Application 13861154.6.

Office Action dated Feb. 23, 2017 from Chinese Patent Application No. 201380072336.2.

Examination Report dated Oct. 6, 2017 from European Patent Application No. 13861154.6.

Notification of Reasons for Refusal dated Oct. 24, 2017 from Japanese Patent Application No. 2015545833.

International Search Report and Written Opinion dated Apr. 4, 2024 from IA PCT/US2023/037265.

* cited by examiner

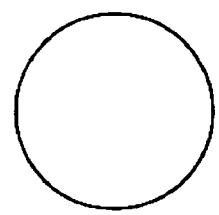
FIG. 2C
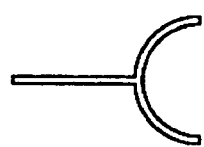
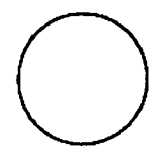
FIG. 2B
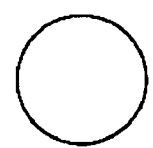
FIG. 2A

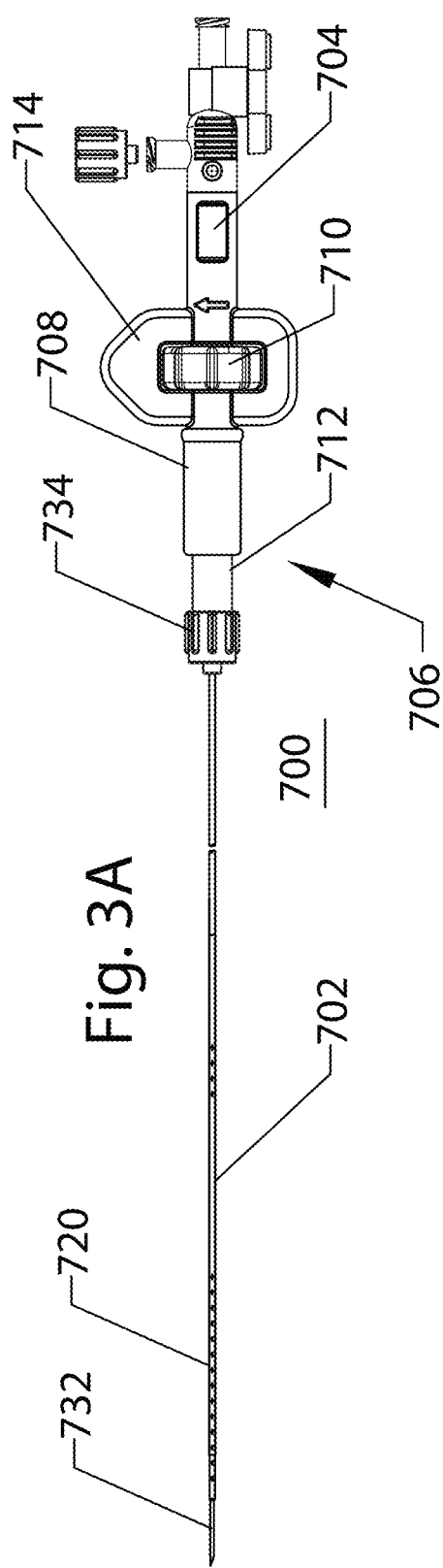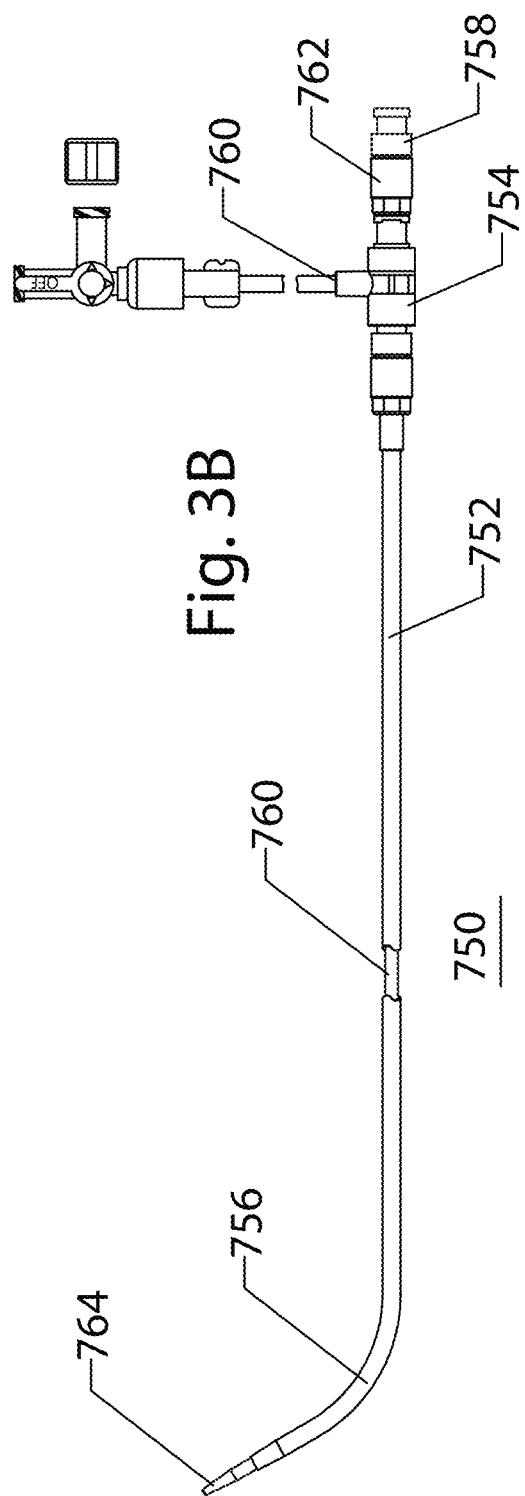

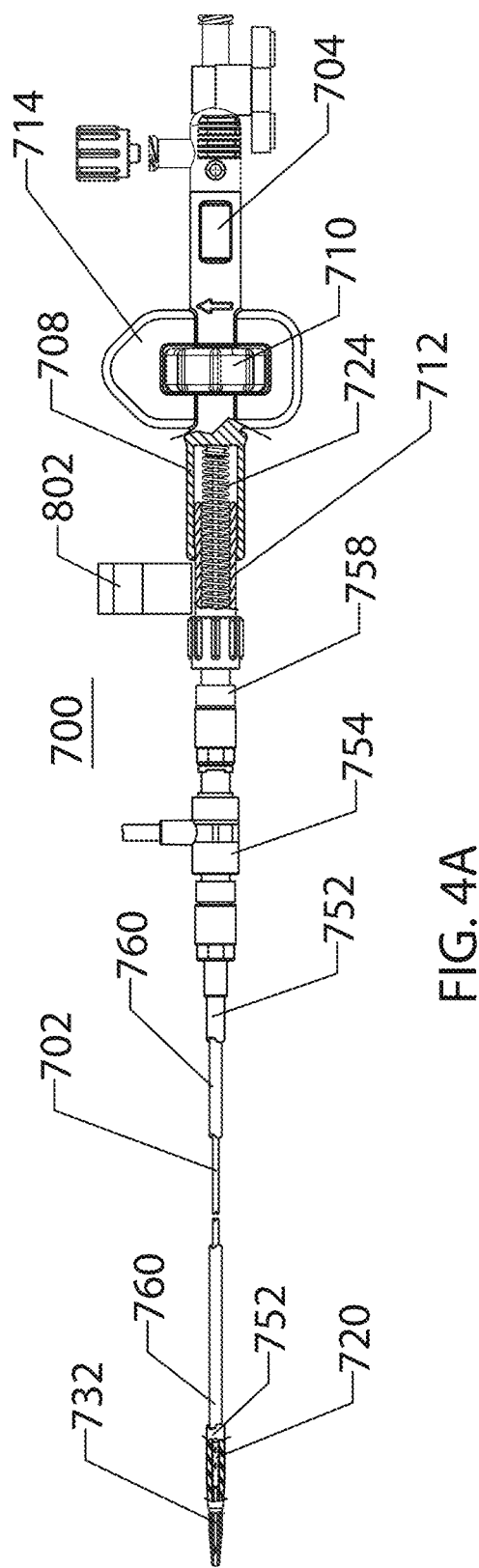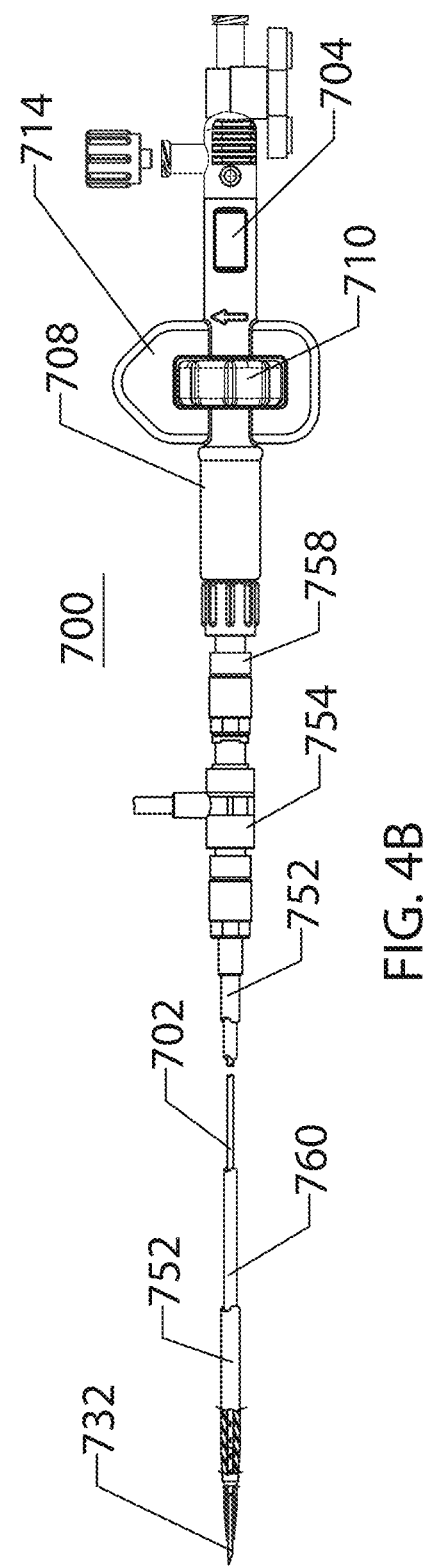
FIG. 4A
FIG. 4B

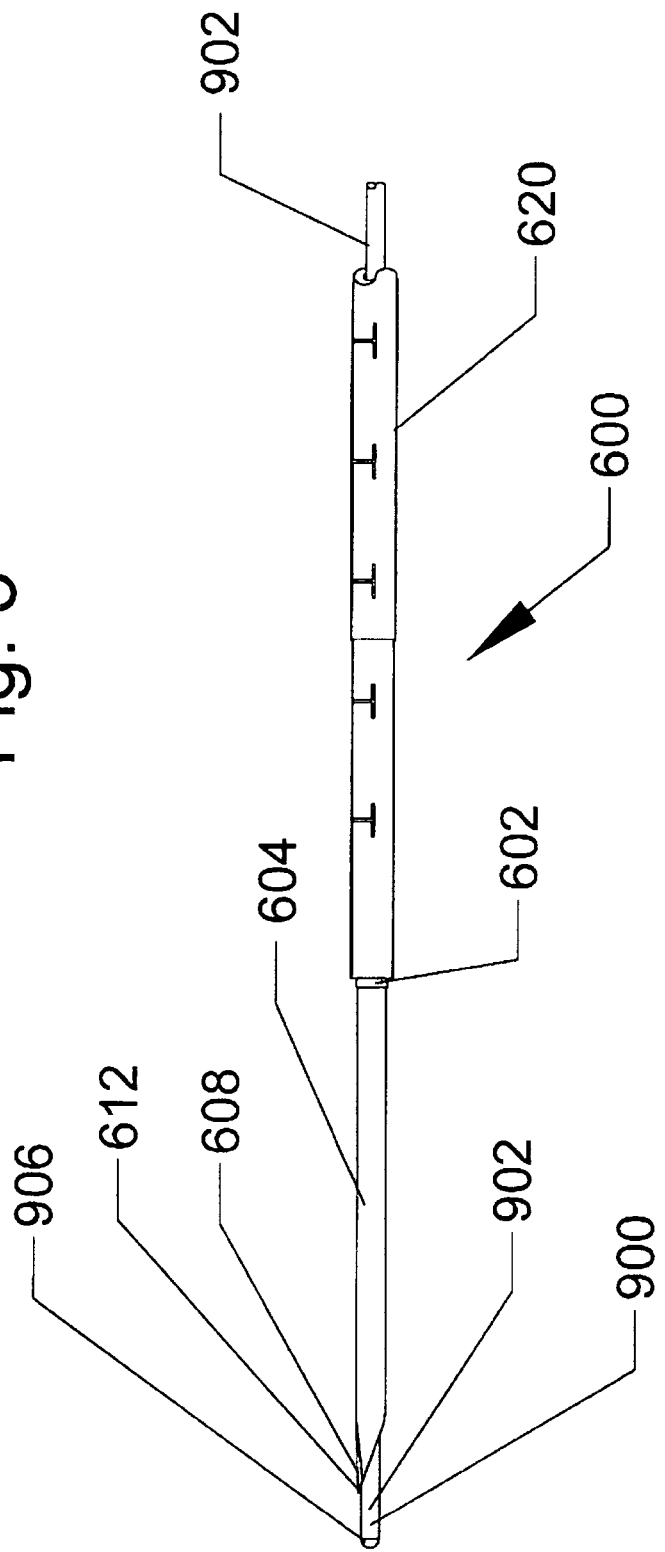

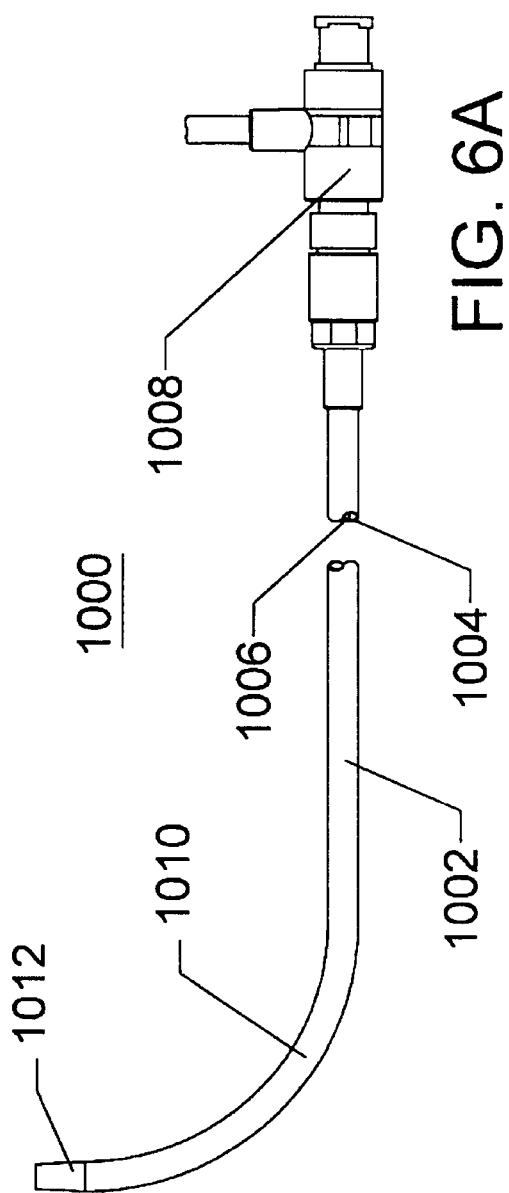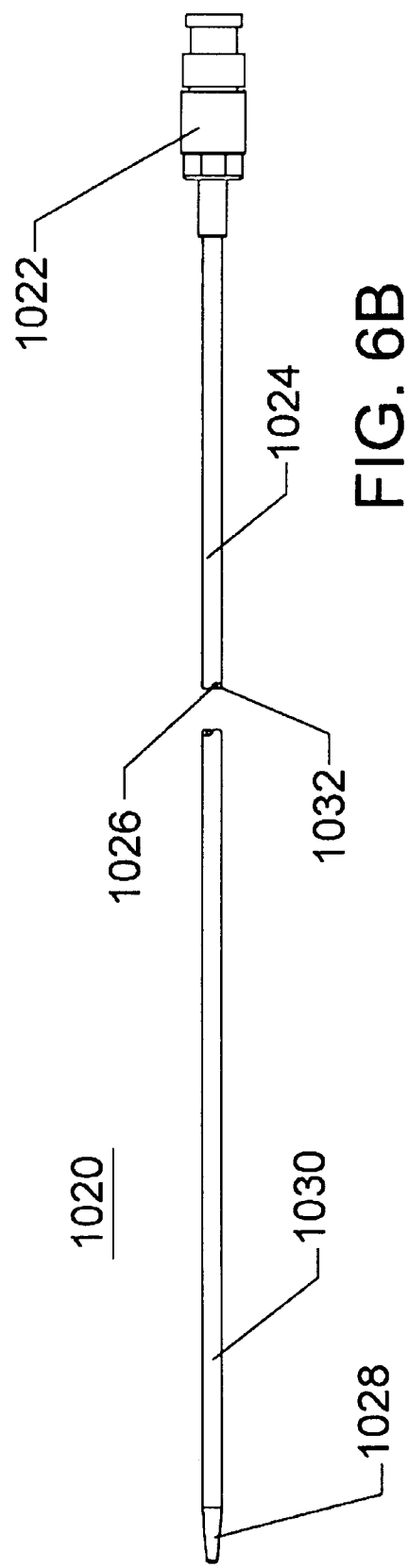

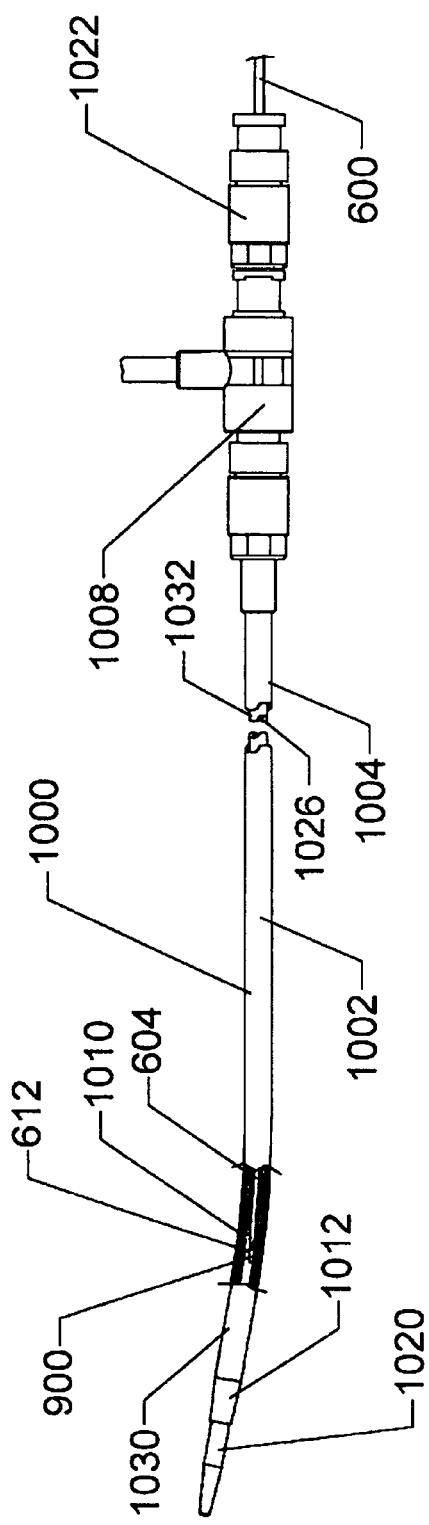
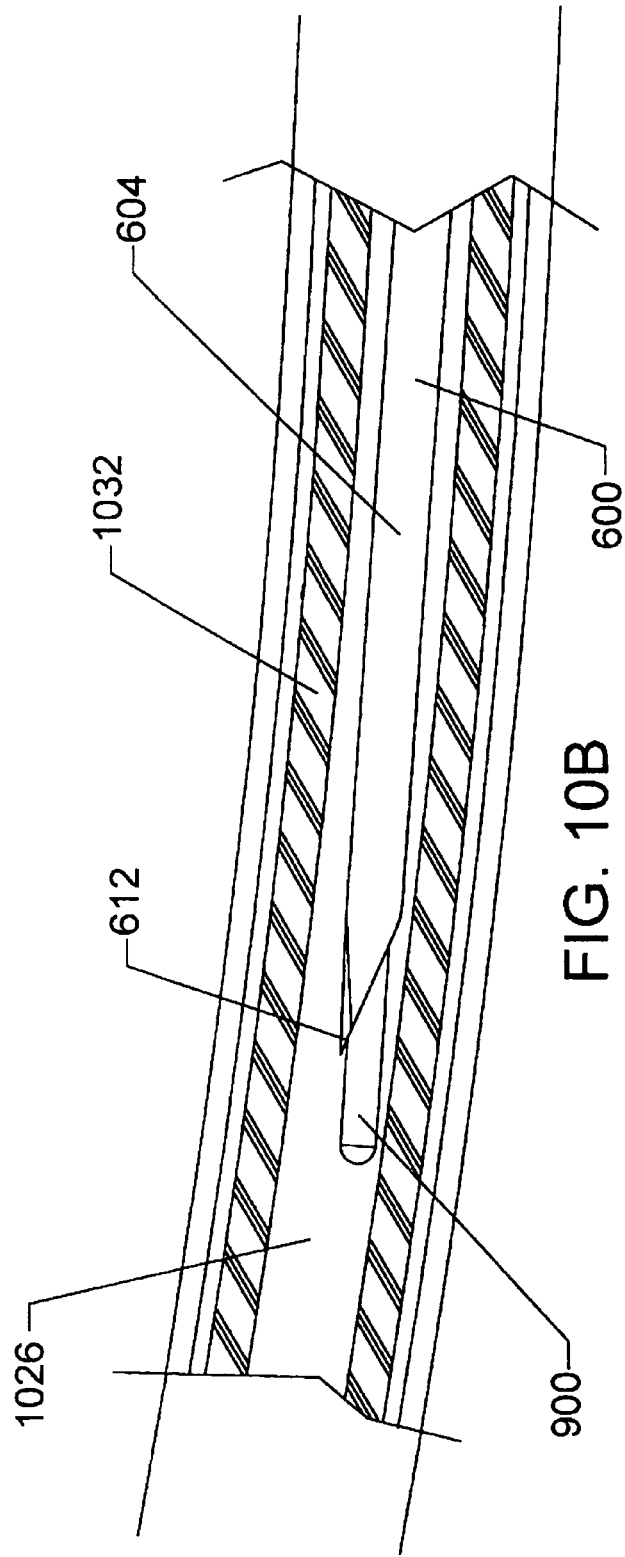
FIG. 10A
FIG. 10B

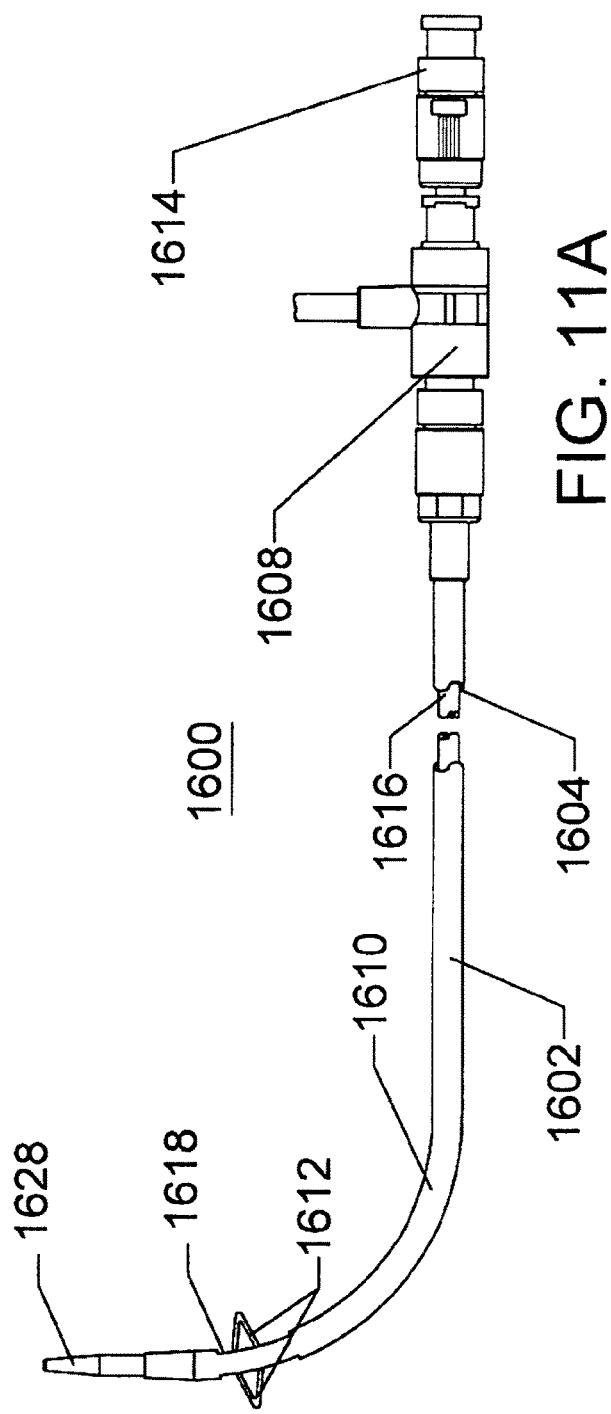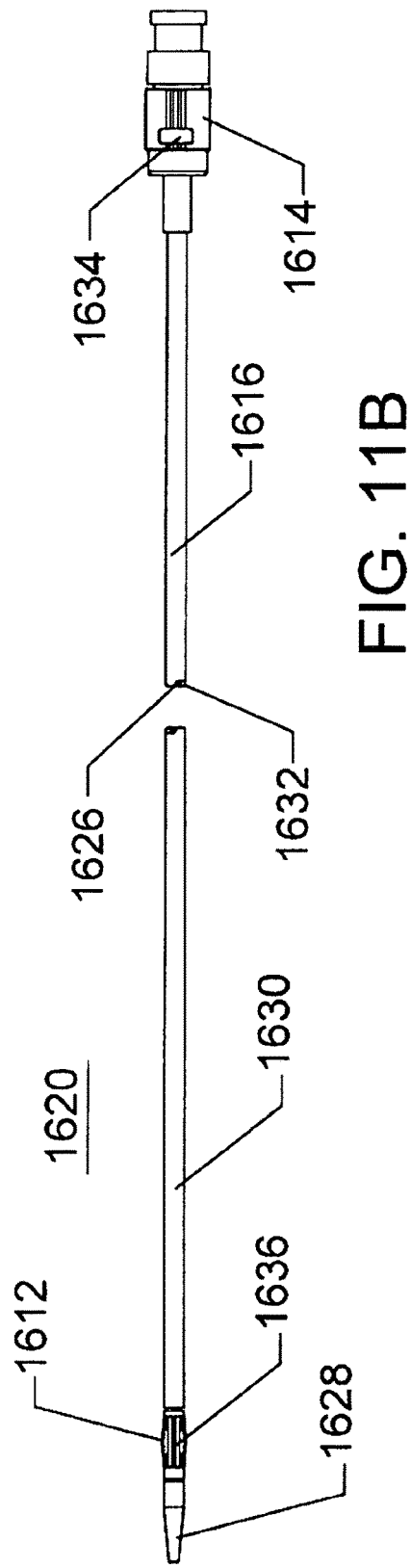

ROBOTICALLY CONTROLLED STEERABLE ACCESS SYSTEM AND METHOD OF USE

PRIORITY CLAIM

This patent application claims priority to Indian Wells Medical, Inc. provisional patent applications 63/247,741, filed Sep. 23, 2021, the entirety of which is hereby incorporated herein by reference.

FIELD OF THE INVENTION

The invention relates steerable endoluminal punches and robotic control systems for steerable endoluminal punches.

BACKGROUND

The currently accepted procedure for left atrial access involves routing a needle called a Brockenbrough needle into the right atrium with the Brockenbrough needle pre-placed within a guiding catheter. The guiding catheter specifically developed for use with a Brockenbrough needle is called a Mullins catheter or transseptal introducer. Other transseptal introducers are now available with features not present on the Mullins transseptal introducer but are essentially the same devices. The Brockenbrough needle is a long, small diameter access system, generally formed from a first, larger diameter stainless steel tube with a second, smaller diameter stainless steel tube projecting out the distal end of the first stainless steel tube. A hub is affixed to the proximal end of the larger diameter stainless steel tube. The Brockenbrough needle is routed endovascularly to the heart, wherein it performs a tissue penetration procedure to cross through myocardium from the right side to the left side of the heart. Other devices, designed for the same purpose, can employ radiofrequency ablation to perforate the atrial wall but these devices expose the myocardium to burning, potentially reduced healing characteristics, thromboembolic events, and increased risk of subsequent scarring.

SUMMARY OF THE INVENTIONS

This specification describes ways of constructing and using a steerable endoluminal punch, which is a device to penetrate the interatrial septum of the heart. Moreover, these systems can be adapted to not only describe Brockenbrough needles and steerable endoluminal punches but they can also comprise the methodology to build and use catheters, guidewires, instruments, and other devices. All of these devices are collectively termed, herein, as Steerable Access Systems (SAS). These steerable access systems can be placed through an introducer, which generally comprises an outer sheath tube and an inner sheath dilator, or obturator. The obturator/dilator is generally tapered at its distal tip to dilate tissue as the introducer is advanced distally.

In some embodiments, the sheath and dilator can both be substantially straight and uncurved along the longitudinal axis. In some embodiments, the introducer can comprise a curve at its distal end. The outer sheath distal end can comprise the curve as well as the dilator distal end. In other embodiments, the outer sheath can comprise the curvature while the removable, central dilator/obturator can comprise a generally straight, unbent, moderately curved, or gently curved distal end. This straight, unbent distal end of the dilator can facilitate passage of the steerable access system with little or no risk of skiving plastic off the interior walls of the dilator lumen. The dilator (and sheath) can then be articulated by the steerable access system. After removal of the steerable access system and the dilator, the sheath can assume its native curvature, which can be configured for optimal access to a target region in the patient.

In certain embodiments, especially where the outer diameter of the devices varies from about 0.030 to 0.050 inches, special considerations need to be taken to ensure that column strength, torqueabilty, and force transmission are maintained while allowing for tube bending with the structure staying in the elastic range for stress and strain. The solutions to this consideration can comprise complex lateral and longitudinal cuts in the inner and outer tube such as windows, spirals, backbones, and the like.

In some embodiments, the SAS can comprise measuring capability to provide feedback to the user or a computer regarding parameters such as, but not limited to, tip deflection angle, tip deflection percentage, axial location, ultrasound imaging (both 2-D and 3-D static as well as real-time 3-D), and the like. The SAS can comprise one or more gauges or readouts for the deflection data or it can be operationally coupled to a computer which can analyze deflection, position, and the like. Deflection sensors or gauges can include a mechanical linkage to the jackscrew or other moving part within the hub, strain gauges affixed to a portion of the bending region of the needle tubing, Hall-effect sensors to measure knob rotation count, and the like. In other embodiments, the SAS can comprise a sharpened distal end suitable for penetrating tissue, it can comprise a flat, curved, rounded, or blunted distal end featuring a more atraumatic configuration designed to minimize the risk of tissue damage or penetration.

In some embodiments, the steerable endoluminal punch or other SAS can be part of a robotic delivery system. The eerable endoluminal punch or other SAS design disclosed herein, generally comprising all metallic force transmission and configuration control components, allows for accurate and reproducible, steering, articulation, torque delivery and catheter passage through the body thus enabling robotic delivery in ways that were previously not achievable.

BRIEF DESCRIPTION OF THE DRAWINGS

FIG. 2B upper illustrates a semicircular slot cut through a piece of tissue by an access system with circumferential or V-shaped blade and FIG. 5B bottom shows the same semicircular slot dilated to its maximum potential diameter with no tissue stretching, according to an embodiment of the invention;

FIG. 2C upper illustrates a semicircular slot cut through a piece of tissue and an additional radial slit created by the cutting element of an introducer dilator as illustrated in FIG. 3B while FIG. 5C bottom shows the same slot dilated to its maximum circular diameter with no tissue stretching, according to an embodiment of the invention;

FIG. 3A illustrates a side view of an access system hub including a component which connects the access system hub to the hub of an introducer dilator, wherein the access system is spring biased proximally away from the introducer dilator hub, according to an embodiment of the invention;

FIG. 3B illustrates a side view of an introducer sheath including a tapered dilator with a lumen capable of accepting the access system of FIG. 7A, according to an embodiment of the invention;

FIG. 4A illustrates a side view, in partial breakaway, of the access system of FIG. 7A inserted through the introducer of FIG. 7B, according to an embodiment of the invention;

FIG. 4B illustrates a side view of the distal end of the access system of FIG. 7B with the safety clip is removed and the tip advanced distally into the dilator to expose the sharp end of the access system distal to the dilator tip, according to an embodiment of the invention;

FIG. 5 illustrates a side view of the distal end of the access system wherein a blunt, large diameter protective stylet has been advanced through the lumen and protrudes out the distal end to shield the sharp tip from the wall of an introducer dilator, according to an embodiment of the invention;

FIG. 6A illustrates an introducer comprising a sheath with a curved distal end, according to an embodiment of the inventions;

FIG. 6B illustrates a separate, substantially straight, removable dilator, according to an embodiment of the inventions;

FIG. 10A illustrates an introducer, with a steerable endoluminal punch inserted therethrough, with the tip of the steerable endoluminal punch negotiating the tip curvature, with a breakaway region in the curvature distal region of the introducer.

FIG. 10B illustrates an enlargement of the breakaway section in the curved region of FIG. 10A, according to an embodiment of the inventions;

FIG. 11A illustrates an introducer comprising a sheath and dilator wherein the sheath includes distal windows and the dilator includes features which radially expand through the windows in the sheath to form a motion stop, according to an embodiment of the inventions;

FIG. 11B illustrates the dilator for the introducer set of FIG. 16A wherein the radially expandable features proximate the distal end are retracted radially inward, according to an embodiment of the inventions;

DETAILED DESCRIPTION

Figure 1:
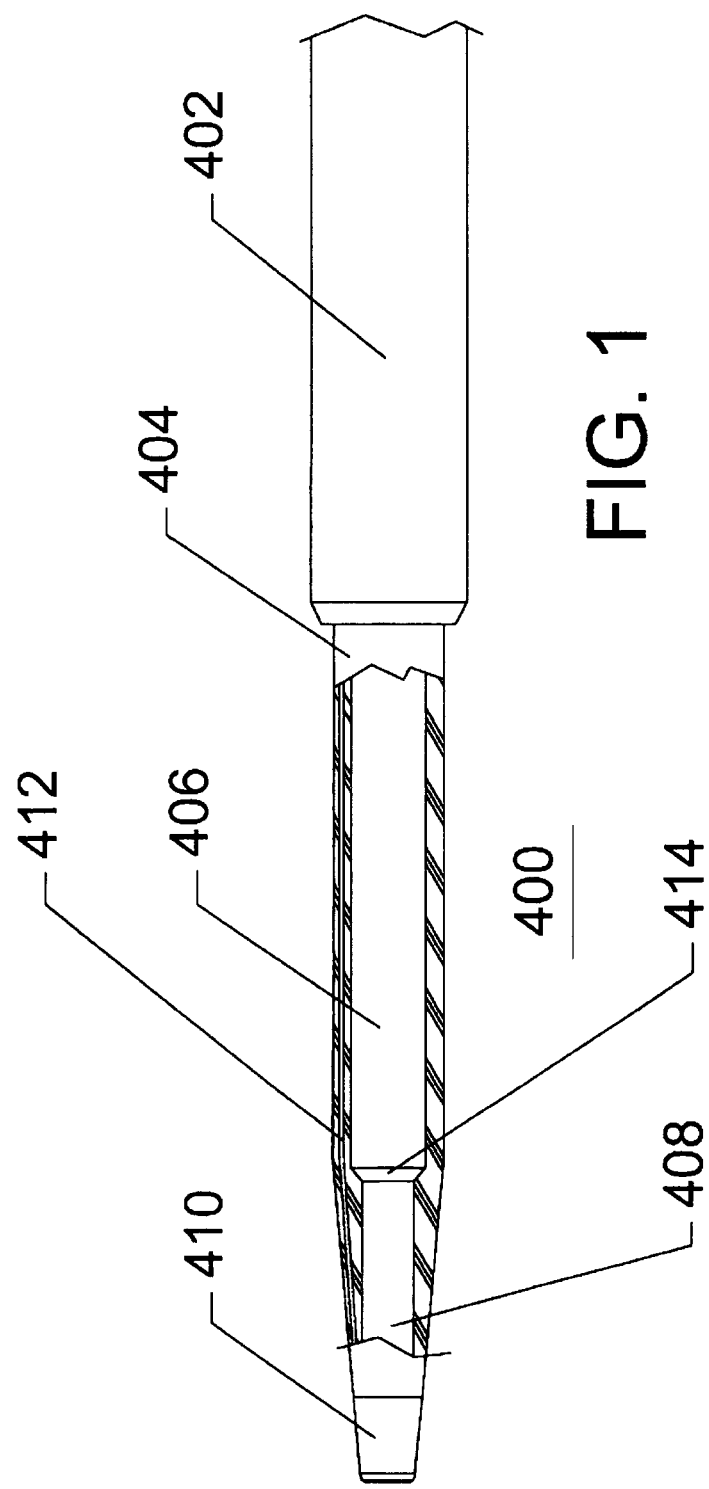
FIG. 1 illustrates an introducer, further comprising a dilator in side partial breakaway view, whereby the dilator comprises a central lumen and a side lumen for passage of instrumentation, linkages, wiring harness, energy delivery or measurement, and the like, according to an embodiment of the invention, FIG. 2A upper illustrates a hole poked through a piece of tissue and FIG. 5A bottom illustrates that same hole dilated to 0.032 diameter by the tip diameter of a SAS.

In accordance with current terminology pertaining to medical devices, the proximal direction will be that direction on the device that is furthest from the patient and closest to the user, while the distal direction is that direction closest to the patient and furthest from the user. These directions are applied along the longitudinal axis of the device, which is generally an axially elongate structure having one or more lumens or channels extending through the proximal end to the distal end and running substantially the entire length of the device.

In an embodiment, the steerable endoluminal punch is an endoluminally, transvascularly, or endovascularly placed tissue punch, with internal steerability, otherwise known as deflectability or the ability to articulate, at its distal end, in a direction away from its longitudinal axis. The punch is generally fabricated from stainless steel and comprises an outer tube, an intermediate tube, a central stylet wire, and a distal articulating region. The deflecting or articulating mechanism is integral to the punch. The punch, needle, or catheter is sufficiently rigid, in an embodiment, that it can be used as an internal guidewire or internal guide catheter. The punch is useful for animals, including mammals and human patients and is routed through body lumens or other body structures, such as non-luminal soft tissue, to reach its target destination.

In an embodiment, the steerable endoluminal punch comprises a core wire or stylet, an inner tube and an outer tube. The inner tube can comprise a sharpened distal end to facilitate tissue puncture. The sharpened end can comprise bevels, facets, conical sections, sharpened blade-like structures, or the like. The core wire or stylet can be blunted at the distal end to prevent damage to structures such as tissue, the sheath, or the dilator (obturator) during advancement of the access system, caused by the sharpened distal end of the access system. In an embodiment, the stylet can be removable or non-removable. In some embodiments, the stylet can have a large diameter to minimize trauma and shield sharp structures on the distal tip of the access system. The access system further comprises a hub at its proximal end which permits grasping of the punch and can also include a stopcock or valve to serve as a lock for the stylet, as well as a valve for control of fluid passage into and out from the innermost lumen within which the stylet or inner core wire resides. The hub can further comprise additional ports to facilitate the administration or withdrawal of fluids or pressure measurement. The additional ports can be terminated with Luer lock connectors or with flexible lead lines terminated with Luer lock connectors, stopcocks, or the like. The proximal end further can comprise one or more control mechanisms to manipulate the amount of articulation at the distal end of the catheter. The proximal end further is terminated with a female Luer or Luer lock port, which is suitable for attachment of pressure monitoring lines, dye injection lines, vacuum lines, a combination thereof, or the like. Other structures can be provided to alter the distal tip of the access system such as changing it from blunter and less traumatic to sharper and more capable of tissue penetration. Such distal tip altering structures can include a piercing stylet which has an extremely sharp distal end or which transmits energy to the distal tip of the access system. The energy can be in the form of simple manually applied force, mechanical vibration, mechanical rotation, ultrasound, high intensity focused ultrasound, electrical power to heat the distal tip, cryogenic energy, laser energy, and the like. The distal tip altering structure can comprise a quick release or controlled retraction mechanism which can be without feedback or control or it can be responsive to measurements of force, tissue properties, or the like.

Other embodiments of the inventions comprise methods of use. Keeping the method of use as close to current techniques is preferable since it reduces the learning curve and physician confidence in the procedure. The general procedure comprises placing a guidewire beyond the right atrium via a percutaneous access point in the right femoral vein or jugular vein. A transseptal introducer is advanced over the guidewire, the transseptal introducer comprising a sheath and a dilator (or obturator). The dilator or obturator further comprises a shaft, a tapered distal tip, a central through lumen, and a hub affixed to the proximal end of the shaft. The sheath comprises a hemostasis valve to seal to the dilator shaft, a side-port with stopcock communicating with the central lumen of the sheath, and the like. The sheath and the dilator can comprise a pre-formed curve near the distal end. The guidewire is next removed and a steerable endoluminal punch or other crossing system is advanced through the central lumen of the dilator or obturator. The steerable endoluminal punch with the transseptal introducer riding on its back (or preferably, actually riding over the steerable endoluminal punch concentrically) can be targeted at a specific site on the interatrial wall, generally in the area of the Fossa Ovalis. The tissue is tented by the dilator to stretch the tissue at the target site and exert a crossing force on the tissue. The steerable endoluminal punch is preferably retracted within the blunt distal tip of the obturator to prevent any chance of unwanted or inadvertent tissue perforation. Once the target is secured, the steerable endoluminal punch is advanced distal to the distal tip of the obturator thus exposing it to the tissue and causing cutting of the tented tissue. The steerable endoluminal punch and obturator/sheath are advanced across the tissue to gain access to the other side. The steerable endoluminal punch and dilator can be removed at this time to provide a pathway through the sheath or a guidewire can be reinserted to provide a track for subsequent catheterizations.

In some embodiments, the inner tube, the outer tube, or both can have slots imparted into their walls to impart controlled degrees of flexibility. The slots can be configured as "snake cuts" to form a series of ribs with one or more spines. The spines can be oriented at a given circumferential position on the outer tube, the inner tube, or both. The spines can also have non-constant orientations. In some embodiments, only the outer tube is slotted. The slots can be generated within the distal portion of the outer tube where the curve is generated. This bendable distance can range between about 0.5-cm and 20-cm of the end and preferably between about 1-cm and 12-cm of the distal end. The slot widths can range between 0.001 inches and 0.010 inches with a preferable width of about 0.001 to 0.005 inches. In exemplary embodiments, the slot widths are about 0.003 inches. In some embodiments, it is desirable to have the outer tube bend in one direction only but not in the opposite direction and not in either lateral direction. In this embodiment, cuts can be made on one side of the outer tubing within, for example, the distal 10-cm of the tube length. Approximately 10 to 30 cuts can be generated with a width of approximately 0.001 to 0.015 inches. The cut depth, across the tube diameter from one side, can range between about 1% and 90% of the tube diameter. In an embodiment, the cut depth can be approximately 30% to 90% of the tube diameter with a cut width of about 0.005 inches or less. A second cut can be generated on the opposite side of the tube wherein the second cut is approximately 0.005 inches or less. In an embodiment, the outer tube can be bent into an arc first and then have the slots generated such that when the tube is bent back toward the 0.005-inch-wide cuts, the tube will have an approximately straight configuration even through each tube segment between the cuts is slightly arced or curved.

The steerable needle, in other embodiments, can comprise monitoring systems to measure, display, announce, record, or evaluate operating parameters of the steerable transseptal needle. In an embodiment, the steerable transseptal needle can comprise strain gauges to measure the force being applied by the user to bend the needle. A torque gauge can also be comprised by the system to measure torque being applied to the control knob or the torque being applied by the distal curvature movement. The strain gauge or torque gauge can be affixed within the hub or elsewhere within the steerable transseptal needle to measure compression or tension forces. This information can be displayed in the form of a readout device, such as a digital display of the force or torque. The number of turns can be counted and displayed by, for example, a Hall-effect sensor, mechanical counter, or the like. In an embodiment, the force or toque can be correlated to the angle of deflection at the distal end, the number of turns applied to the control knob, or both. The readout can be digital or analog and can be affixed to the hub or can be wirelessly received and displayed on external equipment such as a smart phone, computer, tablet computer, panel display, or the like. The wireless technology can, for example, comprise Wi-Fi, Bluetooth®, or other standardized communication protocols. The human interface can, in other embodiments, comprise audible feedback such as a simple beep or tone, or it can be more sophisticated and provide information using language callouts such as force, turns, torque, or the like.

In operation, the system operates similarly to the standard steerable transseptal needle with a few exceptions. The procedure is to advance a steerable transseptal needle, with a tissue piercing stylet affixed in place, through a transseptal introducer that has already been placed. The steerable transseptal needle is articulated to generate the proper curve, as determined under fluoroscopic or ultrasound guidance. The steerable transseptal needle transseptal introducer assembly is withdrawn caudally out of the superior vena cava and into the right atrium of the heart. Proper location, orientation, tenting, and other features are confirmed. Radiopaque dye can be injected through the steerable transseptal needle to facilitate marking of the fossa ovalis or blood flow around the distal end of the steerable transseptal needle. Pressure measurements can also be taken through the lumen of the steerable transseptal needle to confirm tracings consistent with the right or left atrium of the heart. Once proper positioning has been confirmed, a safety is removed from the stylet hub and a button on the stylet hub is depressed or actuated to cause the sharpened stylet tip to advance out beyond the distal end of the steerable transseptal needle. This sharpened stylet punches through the fossa ovalis and the septal tissue pulls over the stylet, over the inner tube, and over the obturator or dilator of the transseptal introducer. At this point, the sharp stylet is released and retracts proximally within the steerable transseptal needle. The transseptal introducer is now within the left atrium of the heart and the steerable transseptal introducer can be withdrawn from the lumen of the obturator.

In other embodiments, the SAS can comprise a blunted distal end with a slot at the end to allow a blade to project out the distal end of the SAS. The blunted distal end can be retracted to expose a blade for cutting or the blade can be advanced out the distal end through the slot which would appear like the window of an observatory. The blade can be fixed or it can oscillate or rotate as described herein.

FIG. 1 illustrates a side view, in partial breakaway, of an introducer system 400 comprising a sheath 402, further comprising a central lumen (not shown), and a dilator 404 further comprising a proximal central lumen 406, a stepdown 414, a distal tip lumen 408, and a side lumen 412. In some embodiments, a control linkage (not shown) can be routed through the side lumen 412 such that it is constrained to move axially. Energy drivers, such as described by elements 116 and 216 described in FIGS. 1 and 2 herein can move the control linkage (not shown) to move elements at the distal end of the dilator 404. In other embodiments, the side lumen 412 can comprise an electrical bus, such as a single wire or multiple conductor wire which operably connects to an electrode 410 proximate the distal tip of the dilator to generate energy and promote tissue penetration. Such energy generation can comprise modalities such as, but not limited to, microwave radiation, radiofrequency (RF) radiation, high frequency focused ultrasound (HIFU), and the like. Energy ranges for the radiofrequency ablation can range from about 2 to about 20 Watts with a preferred range of about 5 to 15 Watts. Energy ranges in the ultrasonic system can range from about 1 Watt to about 30 Watts with a preferred range of about 2 Watts to about 10 Watts. The dilator 404, the sheath 402, or both can comprise electrically insulating materials such as polymers.

In some embodiments, such as those configured for delivery of radiofrequency energy to the tissue, an electrode, typically made from conductive, biocompatible, metal, can be affixed to the distal tip of the dilator. The electrode can be configured as a ring, a line or an electrode-patch on the tapered part of the exterior of the dilator tip proximate its distal end. The electrode can be electrically, operably coupled to an electrical bus running through the dilator wall which can then be operably coupled to an RF generator by way of a cable attached to the hub of the access system.

The method of use of the RF introducer dilator tip is that the tip electrode comprises an element disposed along one side of the dilator tip or in the form of a ring electrode. A plurality of electrodes can be disposed along or around the dilator tip to provide for increasing the size of the hole which the dilator can create in tissue. The center lumen of the dilator can comprise a removable or axially advanceable SAS. The dilator tip and surrounding sheath can be advanced against tissue and held there with modest force such that the tissue is tented, dented, poked, or dimpled by the tip of the dilator. The SAS tip can next be advanced distally to the dilator tip to perforate the tissue against which the dilator tip is resting. Should this cut in the tissue resulting from SAS advancement not be sufficient to allow the dilator tip to pass through the incision in the tissue created by the SAS under modest force applied by the operator or robot, the tip electrode can be energized using Ohmic heating, RF energy, or the like. This energy application can burn a hole of sufficient size to permit advancement of the dilator tip through the tissue. The SAS can be retracted proximally back inside the distal tip of the dilator at this point for increased safety so as not to puncture tissue on the other side of the cavity into which the SAS and dilator/sheath are being advanced. The RF energy can be set to discontinue once the electrode no longer touches tissue, or after one of the more proximal electrodes of an array then touches tissue. A timer can also be used to cut power to the tip electrode after a pre-determined period of time has passed.

FIG. 2A illustrates the result of using a pointed object to poke a hole in tissue (upper image) and with further configuration to dilate that hole to the size of a transseptal needle, which is 0.032 inches in diameter, as shown in the lower image. The tissue is tightened as it stretches and it does not readily split or incise due to the lack of stress risers resulting from a poke hole being dilated.

FIG. 2B, upper image, illustrates the result of using a half-round blade or half-trefine to cut a semicircular slice in tissue. The trefine can have a flat distal edge or a beveled or other complex shape distal edge. This semicircular slice can fold outward to its full diameter with little or no stress imposed due to dilation, as shown in the bottom image. Additional dilation of this hole can be performed with less force than needed to dilate the hole created in FIG. 2A. The cutting edge of the access system can beneficially be described as being formed from a circular tube that is beveled at its distal end. The walls of the access system can be sharpened by forming facets or a conical fairing down to a sharp distal edge. If facets are employed, it is possible to generate an extremely sharp tip on the distal edge of the access system. One facet on each side can perform cutting of the semicircular tissue incision but it is also beneficially possible to use two or more facets on each side of the cutting edge to maximize sharpness. The facets can be created by grinding, by electron discharge machining (EDM), by laser cutting, by regular machining, or the like. The inner tube that is terminated at its distal end with the sharp structure can be fabricated from 304 stainless steel, 316 stainless steel, or a precipitation hardening stainless steel like 17-7 PH to allow for heat treating and increased strength in these sharp regions.

Note that a stubby blunt stylet, expandable or non-expandable, can be used to shield the sharp pointed distal end of the access system (SAS) from skiving plastic off the wall of the introducer dilator or from getting dulled by the same interaction. It is generally beneficial to align the direction of curvatures of the access system with that of the introducer and dilator.

FIG. 2C upper image, illustrates the result of using the half round blade from FIG. 2B but further enhanced with a cutting dilator with a radially oriented cutting blade that can generate an incision, shown radially disposed in this FIG. 2B. The radially oriented incision can protrude in various angles to generate maximum tissue splitting with minimal tissue dilation. Thus, larger catheters can pass through the tissue fenestration created by the access system used to generate this hole.

FIG. 3A illustrates a side view of an access system 700, comprising the punch tubing or shaft 702, a hub 704 further comprising a control knob 710, a directional pointer 714, and a hub connector 706. The hub connector 706 comprises a proximal housing 708, a distal housing 712, a spring element 724 (not shown), and a distal end connector 732. The hub connector 706 can be bonded, mechanically affixed, welded, or formed integral to, the hub 704. The hub connector 706 can also comprise a lock 726 (not shown) or safety clip 722 (not shown), which can be removed, applied, engaged, or disengaged. The hub connector 706 is shown spring biased into its maximum length to pull the access system hub 704 as far as possible proximal to the proximal connector 758 of the dilator hub 762 (see FIG. 7B). The access system 700 further comprises a punch shaft or outer tubing 702, an inner tube 732, which can project distally beyond the outer tubing 702, and a bendable region 720.

In all embodiments disclosed herein, a bendable region is defined as a region that possesses bendability greater than that of proximally or distally disposed adjacent regions.

In the embodiment where a lock 726 is included, the lock 726 can be configured to be released by the user and then re-engage when the spring element 724 expands a pre-determined amount, thus preventing a second advancement of the access system 700 until the lock 726 is selectively released again by the user.

FIG. 3B illustrates a side exterior view of an introducer 750 further comprising a sheath 752 and a dilator 760 further comprising a dilator tapered distal end 764. The Luer lock distal end 734 of the access system 700 permits attachment and removal of the access system 700 from a hub 762 of the dilator 760, which comprises removable part of a catheter or introducer 750.

In some embodiments, the compressed spring element 724 can activate a trip, or limit, switch (not shown) which causes the access system 700 to retract inside the dilator lumen without any control on the part of the user. In other embodiments, the compressed spring element 724 can be coupled to a timer that releases a catch (not shown) and causes retraction of the access system 700 inside the dilator lumen.

The bias force generated by the spring 724 can range from about 0.25 pounds to about 5 pounds just prior to full compression. In preferred embodiments, the spring 724 bias force can range from about 0.2 pounds to about 1 pound just prior to full compression, which can be approximately 0.2 inches to 0.5 inches of travel, in the illustrated embodiment.

The spring 712 can, in other embodiments, further be replaced with a magnetic force generation system, pneumatic force generator, hydraulic force generator, motorized (e.g. electric powered) force generator, or the like.

FIG. 4A illustrates a side view, in partial breakaway, of the access system 700 inserted through the central lumen of the dilator 750. The distal end 732 of the access system 700 of FIG. 7A is shown retracted inside the dilator tip 762. The distal end of the access system 700 is operably connected to the hub 704 by the tubing 702. The spring element 724 is shown in this breakaway with maximal expansion and minimal compression. The distal connector 734 of the punch is affixed to the connector base 712. The connector base 712 is constrained concentrically and slides axially within the hub sleeve 708.

In the embodiment shown in FIGS. 4A and 4B, the user removes the clip when ready to activate the tissue incision or puncture mechanism. The user grasps the hub 704 and pushes against the tissue with the introducer 750 and its dilator 760 riding along. The tissue pushes back against the dilator tip 762 with greater force than the tip 732 of the access system so the access system distal tip 732 protrudes out the distal end of the dilator lumen and punches through the tissue. The distal end of the dilator obturator continues to build force until such time as it passes through the tissue, at which point, the access system tip retracts inside the lumen of the dilator, or has already done so upon spring bias, depending on the strength of that spring bias. In this illustration, the safety clip 722 has been removed and/or any type of lock has been disengaged. The hub connector 706 has been compressed axially to compress the spring element 724 minimizing the distance between the access system hub 704 and the connector 758 of the hub 762 of the dilator 760. As a result of such axial compression, the punch shaft 702 is advanced distally relative to the dilator hub 754 and the distal end of the punch shaft 732 is therefore advanced distally relative to the dilator tubing tip 764, thus becoming exposed to the patient environment and able to penetrate tissue.

FIG. 4B illustrates a side view of the distal end 800 of the access system of FIG. 4A with the tip 732 advanced distally beyond and outside the dilator tubing tip 764. The access system distal tip 732 is operably connected to the hub 704 by the punch tubing 702. The punch sharp distal tip 732 is advanced distally relative to the introducer dilator and is exposed beyond the distal end 764 of the dilator 760 by forcing the needle hub 704 distally relative to the dilator hub connector 758. In this configuration, the sharp tip 732 of the access system 700 is capable of penetrating or incising tissue. The spring element 724 compresses and builds energy to bias the distal tip 732 proximally so that when the access system hub 704 is released, unlatched, or otherwise freed, the spring element 724 quickly retracts the punch sharp distal tip 732 inside the distal end 764 of the dilator 760 to render the tip 732 atraumatic and unable to penetrate tissue.

FIG. 5 illustrates a side view of the distal end of the access system 600 comprising a removable protective blunt stylet 900. The blunt stylet 900 comprises the stylet shaft 902 and a stylet hub 904 (not shown) which is affixed to the proximal end of the stylet shaft 902. The stylet shaft 902 comprises an atraumatic tip 906. The stylet hub 904 can be removably affixed to the proximal end hub (not shown) of the access system 600 using methods such as, but not limited to, a bayonet mount, Luer lock, threaded attachment, a clip, or the like. The access system 600, as illustrated, is steerable and includes laterally oriented slots in a bendable region to facilitate bendability. The access system 600 comprises an outer tube 620, an inner tube 602, a plurality of facets 608, a lumen 606 (not shown), and a distal point 612.

Referring to FIG. 5, the blunt stylet shaft 902, at its distal end, is preferably of a diameter sized to slidably fit through the lumen 606 of the access system 600 but yet retain sufficient size so as to be large enough to substantially fill the lumen and to shield the tip 612 as well as edges 610 and sharp facets 608 of the access system 600 from tissue or catheter tubing through which it might be inserted. In other embodiments, the distal end 906 of the blunt stylet shaft 900 can be expandable slightly so that it can pass through the inner tube lumen 606 but then expand diametrically to more completely shield the sharp tip 612 and any features or facets 608 of the access system. This can be accomplished, in an embodiment, by making the stylet shaft 902 from hollow tubing which can be slit in a variety of patterns and then spring biased to a larger diameter configuration with expanded slits. The expansion need only be in the range of 0.002 to 0.020 inches with a preferred range of 0.003 to 0.010 inches. The stylet shaft 902 can be fabricated from stainless steel, nitinol, PEEK, PET, ABS, polyurethane, polycarbonate, or the like. In a preferred embodiment, the lumen 606 through which the stylet passes is about 0.023 inches in dimeter. The expansion can result from inflation of a balloon like structure, spring bias on leaf-like or cage-like structures, elastomeric expansion, or the like. In expandable embodiments, the external structure of the stylet distal end can beneficially be fabricated from lubricious materials so that it can be inserted through the lumen of the access system with minimal drag or friction.

The stylet 902 in a non-expandable configuration comprises a diameter of about 0.021 to 0.022 inches resulting in a very small annular space between the stylet 902 and the inside diameter 606 of the inner tubing 604, which can, for example be around 0.023 inches. It is also beneficial that the wall of the inner tubing be as reasonably thin as possible at its distal edge to reduce any protrusions or edges that could scrape plastic or cut tissue. The wall of the inner tubing 604 can be tapered or faceted down to a minimal distance to minimized protrusions and the wall near the distal tip 612 of the inner tubing can preferentially have a thickness of about 0.001 to 0.005 inches, again to minimize catching on stretched tissue that could cause hang-up of the SAS while being advanced through the tissue. The stylet shaft 902 can protrude to about 0.010 inches beyond the distal tip of the inner tube in a preferred embodiment, with a preferred range of protrusion of about 0.050 to 0.030 inches. The atraumatic distal tip 906 can be substantially hemispherical, as illustrated, or it can comprise a conic section with a round distal end or it can be squared with rounded edges or the like.

In other embodiments, a polymeric stylet 900 can further comprise a molded or otherwise formed distal tip that is formed larger in diameter than the inside diameter 606 of the inner tube 604 but is spring biased to expand outward slightly once advanced distal to the distal tip 612 of the punch. The stylet shaft 902 can comprise a hollow tube or a solid rod in cross-section.

The distal end 604 of the inner tube 602 is beneficially ground to a smaller diameter than the basic shaft 602 of the inner tube to match standard inside diameters of introducer dilators. In some embodiments, the diameter of the distal end 604 of the inner tube can be configured to have a diameter of about 0.032 inches with a preferred range of about 0.0315 to 0.0325 inches, thus matching currently marketed transseptal needles and transseptal introducer dilator lumens. In other embodiments, it is preferable that the distal end diameter 604 of the inner tube range of about 0.033 inches to 0.036 inches. This larger diameter inner tube distal end 604 has the benefit of being able to cut a larger incision in the tissue than the smaller diameter inner tube distal end 604. Furthermore, the larger diameter inner tube distal end 604 will have more strength and resistance to deformation than the inner tube distal end with a smaller outside diameter. In yet other embodiments, where the inner tube is ground to create a circumferential groove for placement of an RO marker (not shown). The 0.033-inch to 0.036-inch OD inner tube distal end 604 can have greater wall thickness to accommodate an RO marker, preferably swaged or compressed into a circumferential well in the OD of the inner tube distal end, without compromising wall strength than does the inner tube distal end 604 with an OD of about 0.032 inches. Furthermore, the RO marker can comprise a thicker wall and thus increase its visibility if the larger diameter inner tube distal end 604 is used in fabrication of the access system 600. This larger outside diameter of the distal end of the inner tube requires that the lumen of the dilator, at its distal end, be larger in diameter than the standard. Guidewire compatibility would be 0.035 inches rather than the current 0.021-inch capacity.

FIG. 6A illustrates an introducer sheath 1000 comprising a tube 1002 further comprising a wall 1004, a lumen 1006, a sheath hub 1008 and a curved distal end 1010. The introducer sheath 1000 is preferably fabricated using reinforcing coils 1012 or braid (not shown) embedded within the wall 1004 to resist lumen collapse and also comprises a tapered exterior at its distal end to minimize any ridges or wall thickness where it tapers down over its dilator shaft 1030. The introducer sheath 1000 can further comprise one or more radiopaque markers 1014 (not shown) proximate the distal tip to facilitate imaging during use. The sheath wall 1004 can be configured to be substantially stiffer than the wall 1024 of the dilator 1020. The sheath 1000 wall 1004 can also be configured to be less stiff than the wall of the dilator 1020 to allow for the dilator 1020 to dominate the force balance between the two items, sheath 1000 and dilator 1020. The sheath wall 1004 can be configured with variable stiffness, for example with the proximal end being more stiff, and resistant to bending, than the distal portion of the sheath wall 1004.

The sheath hub 1008 can comprise a through lumen, a locking proximal coupling, a sideport and line which can optionally be terminated with a stopcock. The sheath hub 1008 can further comprise a hemostasis valve, Tuohy-Borst valve, or the like (not illustrated).

The introducer sheath 1000 can comprise an inner diameter ranging from about 5 French to about 24 French or larger. A preferred inner diameter can range from about 7 French to about 14 French. The wall thickness of the introducer sheath 1000 can range from about 0.004 to about 0.013 inches. The overall length of the introducer sheath 1000, which includes the sheath hub 1008 determines the working length of the dilator 1020. The overall length of the dilator, which includes the dilator hub 1022, determines the working length of the steerable access system 600. Materials of construction of the sheath 1000 and the dilator 1020 can include, but are not limited to, Pebax, Hytrel, polyurethane, PVC, PEEK, PE, HDPE, stainless steel, titanium nitinol, and the like.

The sheath 1000 tubing 1002 can comprise materials having hardness range of about 20A to about 80A with a preferred range of about 40A to about 70A. The hardness and wall configuration can be adjusted to provide a substantially resistance to bending and collapse. In the region of the curve 1010 the hardness and wall configuration should preferentially be adjusted to work with a substantially straight dilator such that when the dilator 1020 is removed, the sheath curve 1010 restores to a correct pre-set value such as about 20 degrees to about 180 degrees, with a preferred range of about 30 degrees to about 90 degrees (illustrated). The sheath tubing wall 1004 can comprise braid reinforcement or coil reinforcement to facilitate bending but not tubing deformation or lumen 1006 collapse. The braid or coil reinforcement can comprise materials such as, but not limited to, polyester, stainless steel, nitinol, titanium, polyimide, and the like. The material can comprise a flat cross section or a rounded cross-section.

FIG. 6B illustrates a side view of a dilator 1020 comprising a substantially linear configuration with little or no lateral curvature. The dilator 1020 comprises a dilator hub 1022, and a tube 1024, further comprising a tube wall 1032, an internal lumen 1026, a straight distal end 1030, and a tapered distal end 1028. The wall stiffness of the dilator 1020 is optimized so that it can be easily articulated by a steerable access system such as the one disclosed herein, but is further capable of substantially reducing the curvature of the sheath 1000, when inserted therethrough. The dilator hub 1022 can comprise a proximal coupling mechanism, an optional hemostasis valve, Tuohy Borst valve, or the like. The dilator tubing 1024 can comprise a braid or coil reinforcement along at least a portion of its length or it can comprise unreinforced material.

Other aspects of the inventions include the method of use. In some embodiments, the patient's vasculature is accessed via a cutdown or a percutaneous procedure such as a Seldinger technique. After the percutaneous access port is placed, a guidewire is routed through the access port through the vasculature to the region near the target treatment site. The access port is removed and an introducer, comprising a dilator and sheath, is advanced over the guidewire to a region proximate the intended treatment site. In a preferred embodiment, the sheath 1000 comprises a distal end with curvature. The dilator 1020 comprises a distal end that is substantially straight. Both the sheath 1000 and dilator 1020 can comprise a degree of flexibility. The guidewire is next removed. A steerable access system 600, with its blunt, protective stylet 900 locked in place and protruding out the distal end of the steerable access system 600 is routed through a lumen of the dilator 1020 to a region proximate the distal end of the dilator 1020. The blunt, protective stylet 900 is next removed from the steerable access system 600. The steerable access system 600 is next articulated to form the desired curve and is aimed at the target region of tissue with a controlled degree of force, while still retracted inside the distal end of the dilator 1020. Once location is confirmed to be on target, the steerable access system is advanced out the distal end of the dilator 1020, thus exposing the sharp tip of the punch 600 to tissue. The tip of the steerable access system 600 cuts a hole, curved or arcuate incision or linear incision in the tissue. The steerable access system 600 distal end, the tapered dilator and the sheath 1000 are next advanced through the incision in the tissue. A guidewire can be placed through the lumen of the steerable access system or the lumen can be used for pressure measurement or dye injection. In an embodiment, the lumen of the steerable access system 600 can be about 0.023 inches in diameter with a preferred range of about 0.010 to 0.26 inches. The outside diameter of the inner tube of the steerable access system 600 can be about 0.0355 to 0.0365 inches with a preferred range of about 0.032 to about 0.037 inches. The steerable access system 600 and dilator 1020 can be removed from the sheath 1000 leaving the sheath, and optionally the guidewire if desired, in place. In other embodiments, the sheath 1000 is removed leaving only the guidewire in place to guide devices for follow-up procedures.

In the embodiment described above, the steerable access system 600 controls the amount of curve of the dilator 1020 which can overwhelm and control the amount of curve of the sheath 1000. The dilator 1020, being substantially straight, is easily traversed by the substantially straight steerable access system 600 with little or no tendency for the punch sharp distal end to shave material off the wall of the dilator or generate emboli. Once the dilator 1020 and steerable access system 600 are removed, the sheath 1000 is free to assume its natural, curved state to facilitate follow-up procedures.

Figure 7:
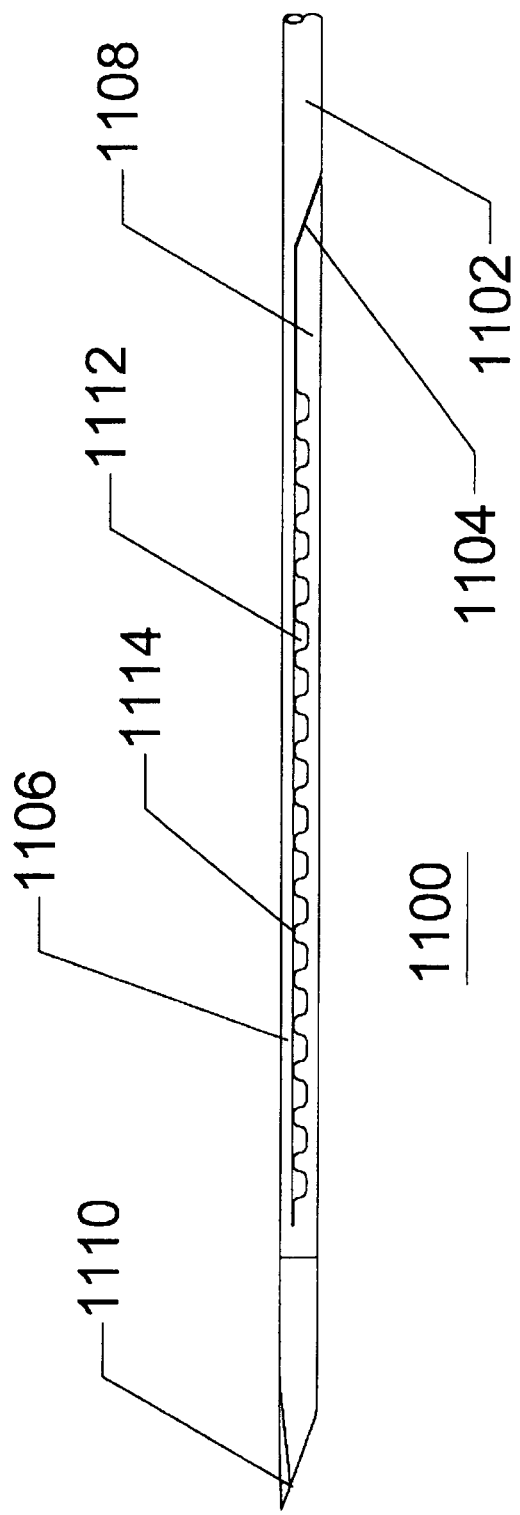
FIG. 7 illustrates an inner tube for a large dimeter SAS configured for increased flexibility while minimizing the risk of material yield, according to an embodiment of the invention.

FIG. 7 illustrates an embodiment of an inner tube 1100 configured for increased flexibility and in larger diameter sizes. The inner tube 1100 comprises longitudinal slot 1104 further modified with a plurality of cutouts or windows 1112 to provide regions of additional flexibility in the inner tube 1100 while still maintaining a spacing function to hold the inner tube 1100 radially outward and adjacent to the inner wall of the outer tube 1200. The cutouts 1112 result in a structure that appears to resemble teeth from the side. It is beneficial to keep the longitudinal slot width minimized in the regions 1114 adjacent to and separating the cutouts 1112. The primary axis of the longitudinal slot 1104 can ride substantially centered when looking from the side, or it can ride off-axis, as illustrated. In FIG. 11, the primary axis of the slot 1104 rides higher than the central axis by about 0.011 inches but this distance can vary to achieve the appropriate area moment of inertia of the connected part 1106 and the separated part 1108. As the tube 1102 diameter grows, the area moment of inertia will likewise grow so steps need to be taken to reduce the area moment of inertia of the cross sections to keep stresses below the yield point for the tube material, as well as preventing displacement or misalignment of the separated part 1108 from the connector part 1106. The distal tip 1110 of the inner tube 1100 is illustrated as being sharpened and is configured for use in generating an incision in tissue. Exemplary materials for construction of the inner tube include stainless steel such as 303, 304, 316 SS, and the like, precipitation hardening stainless steel, titanium, nitinol, and the like. The inner tube can also be fabricated from hard polymeric materials such as, but not limited to, PEEK, polyurethane, HDPE, high durometer Hytrel, Pebax, polyimides, and the like. The inner tube 1100 can be affixed to an anchor in the hub by means such as, but not limited to, adhesive, mechanical couplings such as pins, screws, and other fasteners, welding, soldering, and the like. The number of longitudinal slots 1104 can range between one and about 5, with a preferred arrangement including only a single slot separating a single element of material from the main control rod portion of the bendable region of the inner tube. The single slot, which appears a single slot from both sides of the tube, can be construed as a double slot coming together at a point in the sidewall of the tube. The resulting structure is a tube with a cutout that is not removed but is adherent to the tube at some point.

Figure 8:
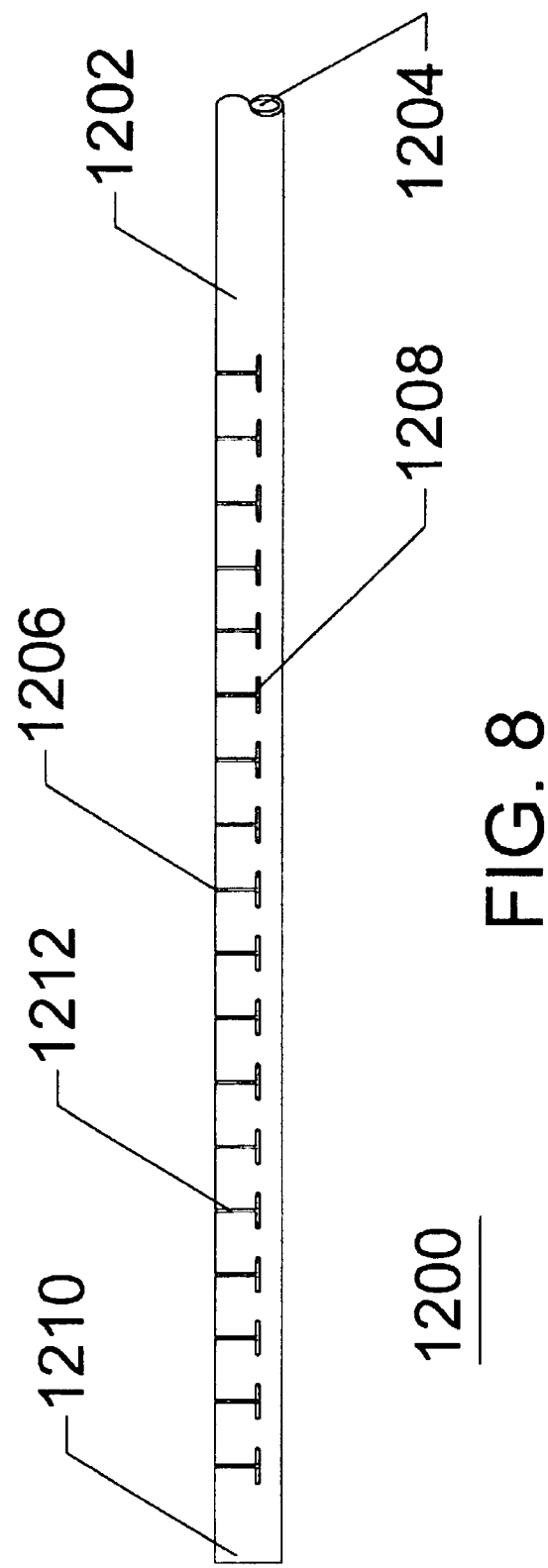
FIG. 8 illustrates an outer tube for a large diameter SAS configured for increased flexibility while minimizing the risk of material yield, according to an embodiment of the invention.

FIG. 8 illustrates an outer tube 1200 configured for increased flexibility in larger diameter sizes. The outer tube 1200 comprises the tube wall 1202 and a central through lumen 1204. The standard T (or H) slots 1212 in the outer tube 1200 are configured with the centerline of the longitudinal portion 1208 of the T or H slot 1202 to ride above or below the centerline of the tube. In the illustrated embodiment, the location of the longitudinal portion of the T or H slot 1206 is about 0.011 inches off axis but this location can vary with tubing diameter and wall thickness. The width of the connector slot 1206 of the T or H slot 1212 may be configured with additional opening width to permit more angular motion of the T or H slot 1212 when tensioned by the inner tube 1100. The width of the connector slot 1206 can vary between 0.001 inches and 0.020 inches with a preferred distance of about 0.002 to 0.004 inches to minimize or prevent the occurrence of stresses beyond yield in the material. The radially directed slot widths determine the amount of flexure that can occur before the slots close and prevent further deformation. Exemplary materials of construction for the outer tube 1200 include stainless steel, precipitation hardening stainless steel, titanium, nitinol, and the like. The inner tube 1100 can be affixed to an anchor in the hub by means such as, but not limited to, adhesive, mechanical coupling, welding, soldering, and the like.

Figure 9:
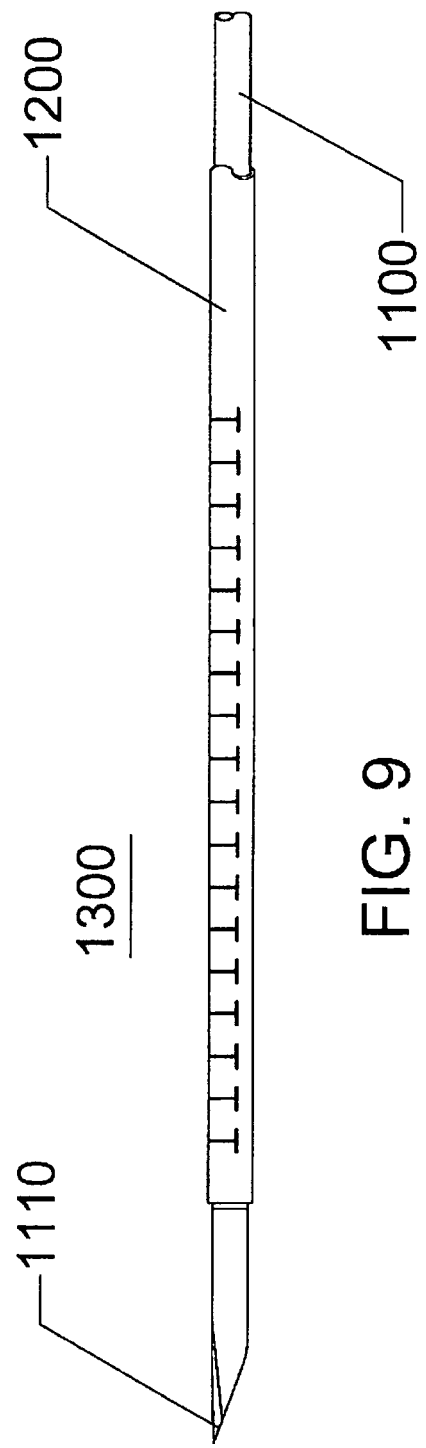
FIG. 9 illustrates an assembly of an inner tube and outer tube for a large diameter SAS configured for increased flexibility while minimizing material yield, according to an embodiment of the invention.

FIG. 9 illustrates an assembly 1300 of the inner tube 1100 of FIG. 7 with the outer tube 1200 of FIG. 8 to result in a SAS of increased flexibility. The cutouts 1112 are preferably aligned with the T or H slots 1212 to facilitate bending in the region of the longitudinal portion 1208 of the T or H slots 1212. The illustrated configuration shows a 15-gauge outer tube and a 17-gauge inner tube. This configuration is larger in diameter than 18-gauge devices. The increased diameter of the inner tube 1100 facilitates increased off-axis moment arm and increased bending force being imparted on the inner tube. However, the area moment of inertia of this larger system is greater than that of the smaller diameter devices and so increasing flexibility may be beneficial in exercising control. This larger diameter 15-gauge system comprises a center lumen 1108 through the inner tube 1100 that can slidably pass a 0.035 or 0.038 guidewire or a center punch with a diameter up to about 0.045 inches or greater. The hub system of the SAS tubing assembly 1300 of FIG. 9 can be the same as that of smaller diameter devices, except for provision for mating with larger diameter tubes.

The SAS of FIG. 9 can further be configured, in other embodiments, with a blunt distal end 1110 on the inner tube 1200, rather than the sharp distal end 1110 as illustrated. In the blunt distal end configuration, the inner tube and outer tube can be combined to form a device that can serve as a steerable introducer, guide catheter, or catheter and is not necessarily a punch.

FIG. 10A illustrates a side view in partial cross-section of an introducer system, wherein a steerable needle or punch (SAS) 600 has been inserted into the central lumen of the pre-placed dilator 1020 within the sheath 1000. FIG. 10B illustrates an enlarged view of the cutaway section in the curvature region of FIG. 10A. The curvature at the distal end 1010 of the sheath 1000 is substantially straightened out by the presence of the dilator 1020, thus affording a substantially straight dilator lumen 1026 when it gets to the distal region 1030. This mostly straightened out dilator lumen 1026 permits the punch tip 612 to be advanced through the curved distal end of the sheath 1000 with a reduced tendency to scrape the dilator walls 1032 and skive off plastic materials into the lumen 1026. The presence of a large diameter, blunted stylet 900 pre-placed within the (SAS) 600, shields the sharp tip 612 of the SAS from the dilator wall 1032 even should the SAS 600 encounter higher degrees of curvature in the sheath tubing 1002 or dilator tubing 1032. This shielding by the blunted stylet 900 helps preserve tip 612 sharpness and, again, reduces the risk of plastic skiving. The blunt stylet 900 tip is beneficially large in diameter relative to the lumen through which it is passed so that it minimizes the radial distance between the stylet 900 outside diameter and the inside diameter of the SAS 600. The blunt stylet 900 tip can comprise a hemispherical, rounded, or mushroom configuration, for example. The blunt stylet tip can be larger in diameter than the stylet shaft to which it is affixed, thus reducing insertion friction through the SAS lumen. For example, the stylet shaft can comprise a wire or tube with an outside diameter of about 0.016 to 0.018 inches while the blunt stylet tip 900 can be a segment of metal tubing which is welded to the shaft wire or tube. The distal end of the blunt stylet 900 tip can be formed round using adhesives, metal forming, melting such as using a laser beam or other heat source, or the like. The metal stylet 900 tip can also be rounded using standard machining or grinding techniques. The blunt stylet tip 900 can, in other embodiments, comprise a hollow configuration with expandable struts which permit its diameter to be spring biased open more than the inside diameter of the SAS 600 and thus provide additional shielding for the SAS sharp tip 612. The expandable struts can be fashioned as longitudinally oriented leaf springs, for example, but other expandable configurations such as those found in many cardiovascular and intraluminal stents would also work.

The SAS 600 is capable of now articulating or deflecting the distal end of the composite system by means of controls on the hub of the SAS 600 or through external control using robotics artificial intelligence, human control, or the like. The SAS 600 and dilator 1020 can next be removed from the lumen 1006 of the sheath 1000 to permit introduction of other instruments for therapy or diagnosis by way of the sheath 1000.

FIG. 11A illustrates an introducer system 1600 for use with the SAS. The introducer system 1600 comprises an axially elongate sheath 1602 defined by a proximal and a distal end, further comprising a sheath wall 1604 and a central through lumen and an obturator or dilator 1610. The dilator 1620 comprises a tapered distal tip 1628 and at least one lumen 1626 configured to accept guidewires, permit fluid passage, slidably pass the SAS, and the like. The introducer 1600 further comprises an expandable enlargement 1612 affixed or integral to the exterior of the dilator tube. The expandable enlargement 1612 is preferably located proximal to the distal end of the sheath/dilator system. The expandable enlargement 1612 can be configured to project outward radially through one or more windows 1618 or fenestrations cut into the wall 1604 of the sheath. The expandable enlargement 1612 can be provided enlarged or it can be configured to be controllably enlarged by an action by the user or some controller. In the illustrated embodiment, a control lever 1634 is operably connected to the dilator hub 1614 and moves a control wire or rod 1636. The expandable enlargement 1612 can also be configured to reduce in diameter or retract completely within the exterior profile of the sheath wall 1604, as illustrated in FIG. 11B. The expandable enlargement 1612 can comprise structures, such as but not limited to, a Moly-Bolt expandable section, a wire loop, expandable balloons, and the like. Radial enlargement of the structure 1612 can occur, due to pressurization or inflation by means of a fluid port on the proximal end and a fluid channel leading to a balloon or other expandable structure. Radial enlargement can also occur due to the relative motion of an inner and outer portion of the sheath that causes the moly-bolt structure to bend wider or straighten narrower. Radial enlargement can also occur due to a wire or control rod 1636 (illustrated) that is advanced or retracted to form one or more loops or petals or otherwise actuate the expansion mechanism (a moly bolt expansion mechanism is illustrated). Radial enlargement can also be generated by electrical actuation (heating, etc.) of a nitinol element pre-treated to expand to a larger diameter. This enlarged portion of the sheath is configured to prevent the sheath from passing too far into the left atrium of the heart or other structure during advancement and tissue puncture. Radial enlargement of elements 1612 can also be generated by longitudinal or rotational movement of the dilator relative to the introducer sheath.

A robotic cardiac access system can comprise a patient, a surgical table, an introducer sheath and dilator, a steerable access system, a position reference between the patient and the steerable access system, the introducer sheath and dilator, or any other diagnostic or therapeutic instrument. The position reference can comprise a reference to the patient directly, to the surgical table, which is then positioned relative to the patient, or to the room, which can comprise fixation relative to the floor, ceiling, walls, or other room components, which can be positioned relative to the surgical table, which is positioned relative to the patient. The position reference is affixed to the Steerable Access system either directly or through intermediate linkages, actuators, or the like.

One or more linear or rotational actuators are affixed to the steerable access system, introducer sheath and dilator, other diagnostic or therapeutic instrument providing for axial movement, rotational movement, and deflection in at least one plane substantially orthogonal to the longitudinal axis of the steerable access system or other instrument. The linear or rotational actuators are affixed to the position reference. The linear or rotational actuators can be controlled, in whole or in part, by inputs directly from the user by way of switches, joysticks, knobs, wheels, buttons, neurocognitive interfaces, voice commands via microphone, eye motion via cameras, free pointers, touch screens, or the like. The linear or rotational actuators can also be controlled, in whole or in part, by a computer system employing position feedback, artificial intelligence (AI), rule-based logic, or the like.

Figure 12:
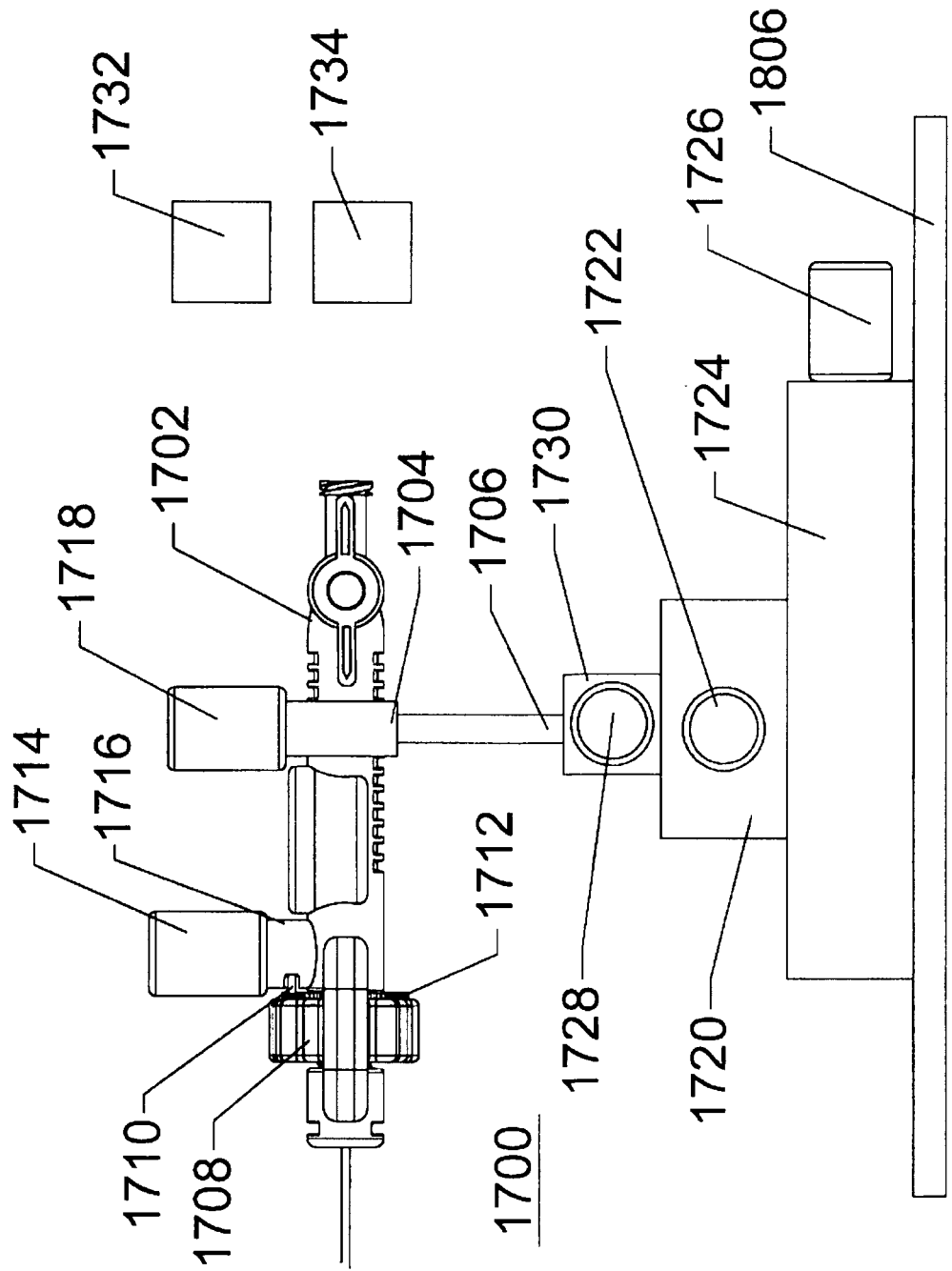
FIG. 12 illustrates a block diagram of a robotic system for accessing the heart, according to an embodiment of the inventions.

FIG. 12 illustrates a robotic system 1700 for a steerable access system, wherein the robotic system comprises a SAS hub 1702, a hub grasping element 1704, further comprising a rotational drive mechanism and motor drive 1718, a catheter grasping arm 1706, a Z axis slide 1730, a z axis motor drive 1728, a Y axis slide 1720, a Y axis motor drive 1722, an X axis slide 1724, an X axis motor drive, a base plate 1706 which serves as the anchor to a reference point, and the SAS hub 1702. The SAS hub 1702 further comprises a manually operated control knob 1708, a gear feature 1712, a deflection motor drive 1714, and a coupling gearbox 1716. The system also comprises a data link 1732 and a controller 1734.

In some embodiments, the method of use is to reference the base plate 1706 to either the patient or an inertial reference point such as the floor, ceiling, or apparatus affixed thereto. The steerable access system hub 1802 is grasped by the system 1700. The steerable access system hub 1802 can be affixed to the reference base plate 1706 by means such as, but not limited to, a snap fit, clamps, fasteners such as screws, bolts, and the like. The steerable access system needle end (not shown) is advanced through the central lumen of an introducer and dilator system (not shown). The hub of the introducer and dilator is grasped by a separate robotic arm affixed to an inertial reference frame and driven in the ±X direction (longitudinal axis) and circumferential rotation (Theta) by similar means as that of the SAS. An actuator on the articulation mechanism can control radial deflection of the SAS tip. The location of the two devices (SAS and Introducer) is monitored constantly with regard to the inertial reference frame as well as with respect to each other by means of MRI, CT, Fluoroscopy, X-Ray, ultrasound, or the like. The robotic system can also control ingress or withdrawal of fluids through the central channel of the SAS, the introducer, or both, using a pressure lead line affixed to a Luer port on the SAS, the introducer, or both. The system can control axial forces, rotational forces, lateral forces, torque, and can provide feedback regarding these parameters to be used as part of the control of the SAS and the introducer. In other embodiments, the device can be driven in the +X direction as well as tip deflection in the ±Y and ±Z directions away from the X axis. In this embodiment, rotation about the longitudinal axis can also be applied. The rotational orientation can benefit from the use of tubing mechanics that maintain torque along the whole length such that rotation of the hub imparts tip rotation, to a measurable degree.

The SAS and introducer can be articulated, advanced, rotated, and aligned, with reference to each other, and with a target region in the patient (not shown) by way of the robotic systems. The system can be targeted at a specific location and pressure applied in a specific quantity. The SAS can be advanced beyond the tip of the introducer dilator such that a sharp edge is exposed, thus causing the entire system to pass through the tissue. The amount of force applied to the target tissue can be carefully controlled such that the system can never be advanced with inappropriate force for a given stage of the procedure, location, etc. or location displacement such that tissue damage potential is minimized by the system. The SAS can be withdrawn from the dilator/introducer whenever the latter is positioned correctly within the target organ. The dilator can also be separately removed leaving the introducer in place for guiding further therapies or diagnostics.

Such therapies include, but are not limited to, cryoablation, RF ablation, mitral valve repair left atrial appendage occlusion, mitral valve replacement, or the like. In the instances where the SAS is replaced by a catheter, microcatheter, guidewire, etc., the robotic system can be used to control the infusion and/or withdrawal of fluids, drugs, and the like. The system can also be used to delivery implants, therapeutic devices, diagnostic devices, and the like. The system can be used to provide for spinal access under high levels of control. The system can be used for placement of shunts such as arteriovenous (AV) shunts and the like. The system can be used to retrieve thrombus and other materials from the body as well as for capture, and/or removal of implants.

Figure 13A:
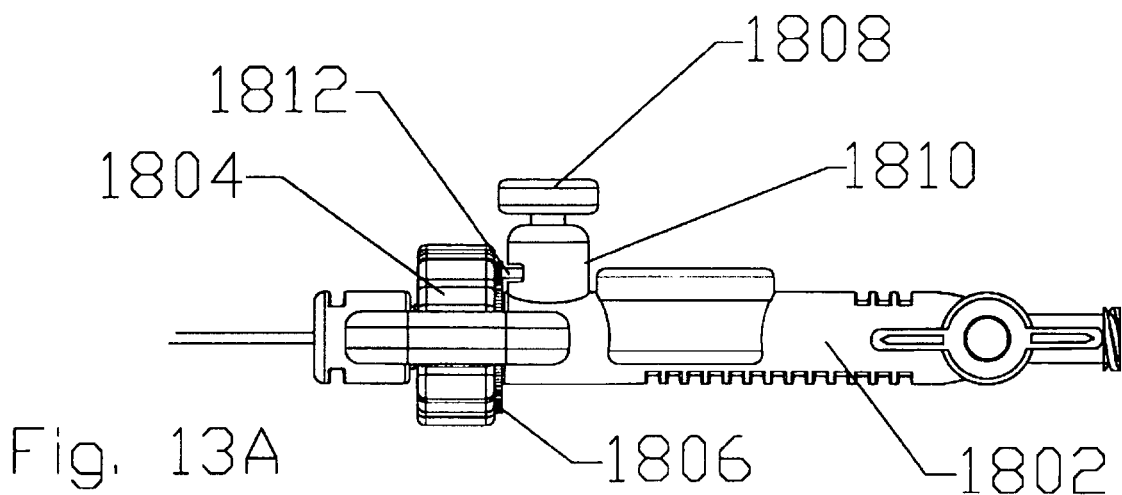
FIG. 13A illustrates a side view of a Steerable Access system comprising a coarse adjust mechanism and a fine adjust mechanism on the hub, according to an embodiment of the inventions.
Figure 13B:
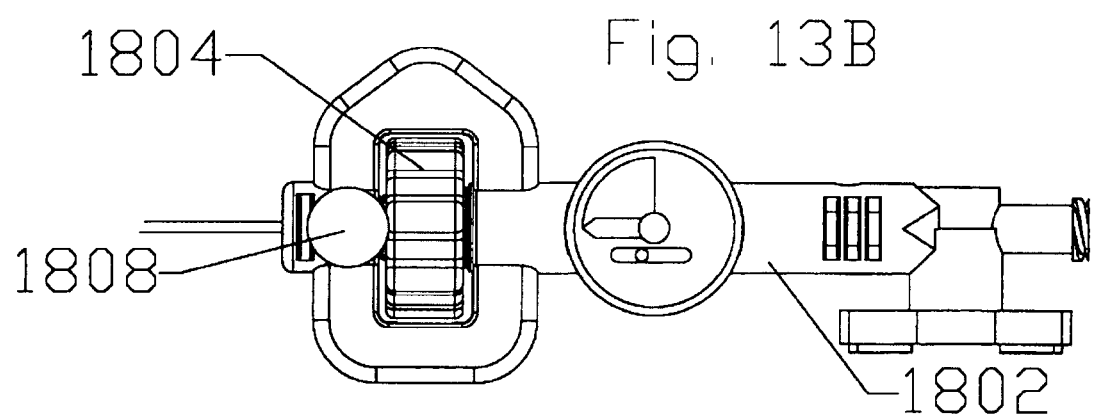
FIG. 13B illustrates a top view of a Steerable Access system comprising a coarse adjust mechanism and a fine adjust mechanism on the hub, according to an embodiment of the inventions.

FIG. 13A illustrates a side view of the hub end of a Steerable Access system 1800 comprising a hub 1802, a coarse adjust control knob 1804, a gear coupling 1806, a fine adjust knob 1808, a gearbox 1810, and a gear interface 1812. The gearbox is affixed to the hub 1802 and houses a gear system that translates movement from the fine adjust knob 1808 to the coarse adjust knob 1804 by way of the gear coupling 1806 and gear interface 1812 such that multiple turns of the fine adjust knob 1808 are required to achieve a small amount of rotation of the coarse adjust knob 1804, albeit with far less torque applied. For example, in an embodiment, the coarse adjust knob 1808 can interface with a jackscrew (not shown) using a jackscrew thread pitch of about 5 to 30 threads per inch with a more preferred range of 10 to 20 threads per inch. Once initial bend has been obtained by turning the coarse adjust control knob 1804, a more precise bend, or a bend at higher force and higher deflection can be obtained using the fine adjust knob 1808 which is geared to produce a final thread pitch of about 20 to 100 turns per inch. FIG. 13B illustrates a top view of the SAS of FIG. 13A.

The two knobs can be reversed in terms of their position, as shown. Furthermore, the fine adjust knob 1808 can be located elsewhere on the hub 1802, for example distal to the coarse adjust knob 1804, thus providing for a more ergonometric control and human interface. In an alternative embodiment, a variable pitch jackscrew can be employed to allow quick advance of the articulation in low angular deflections and more power applied with less advance when deflection gets greater and the force of deflection increases. In yet another embodiment, a double or triple pitch discreet jackscrew can be employed to provide for quick movement in the low force low angular deflection region, and increased mechanical advantage but less movement per control application in the higher force, higher deflection regions.

Figure 14A:
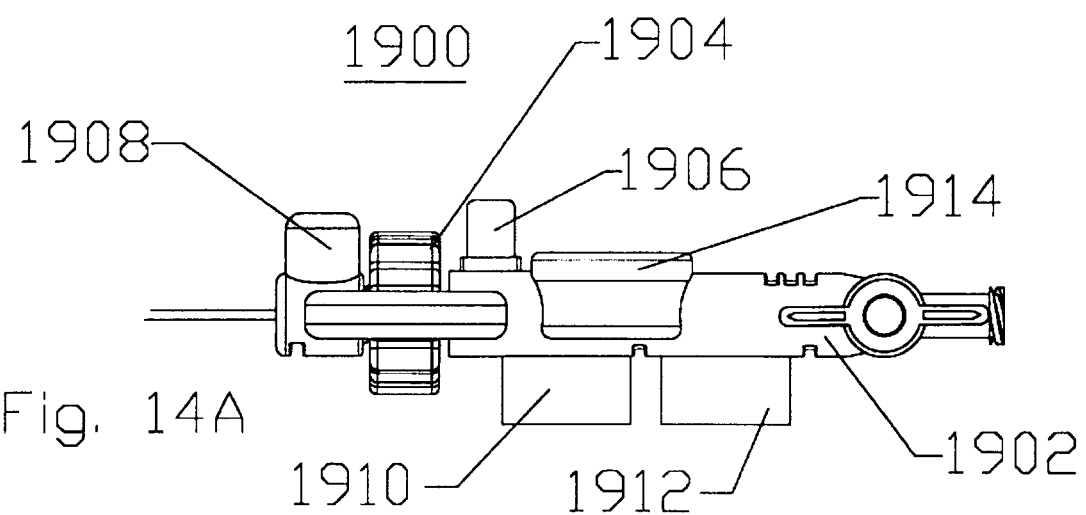
FIG. 14A illustrates a side view of a Steerable Access system comprising a stepper motor, a power supply, a user control element, and a motor controller configured to deflect the distal tip, according to an embodiment of the invention.

FIG. 14A illustrates a top view of a steerable access system 1900 comprising a hub 1902, a jackscrew system powered by a motor drive 1908. The motor drive 1908 can be a stepper motor, brushless DC motor, or the like. The motor drive 1908 can be coupled to a jackscrew (not shown) with a rotary nut, which can be further connected to a manual control knob 1904, if desired. The rotary nut can also comprise an integral threaded region of the control knob 1904. The rotary nut (not shown) can be rotated by the motor drive 1908 in response to control signals sent from a controller 1910 and power supply 1912. The controller 1910 can obtain its control input from a user interface 1906, such as, but not limited to, a toggle switch (illustrated), rocker switch, joystick, touchscreen, voice command, foot pedal, or the like. The toggle switch 1906 can comprise a momentary on/increase and momentary on/decrease function with a spring biased return to off after removal of the control force. Feedback on articulation can be provided by visual observation under fluoroscopy, MRI, echocardiography, or the like. Feedback can also be provided by way of a meter 1914, gauge, strain gauge, Hall effect sensor, or other device affixed between the jackscrew (or other moving element) and the hub. The feedback can be provided to the user by way of a visual interface, audio interface, internal controller feedback within a computer, or the like.

Figure 14B:
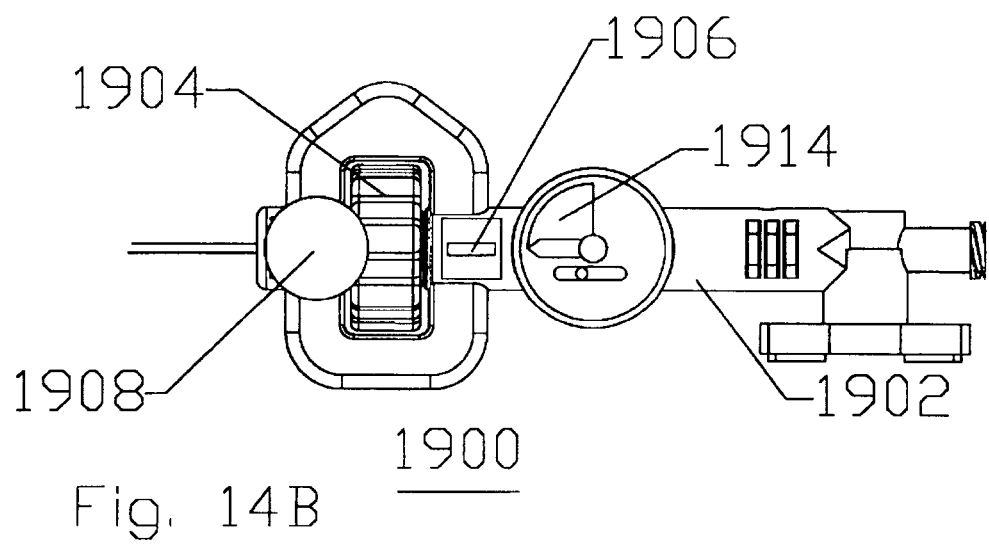
FIG. 14B illustrates a top view of the Steerable Access system of FIG. 19A, according to an embodiment of the inventions.

FIG. 14B illustrates a top view of the SAS of FIG. 14A. The power supply 1912 can comprise a battery having chemistry such as, but not limited to, alkaline, lithium ion, nickel cadmium, and the like. The controller 1910 can comprise a computer-like circuit with feedback on the amount of deflection imparted on the jackscrew. The power supply can be rechargeable or non-rechargeable with the rechargeable version able to be charged by hard wire or by an induction system.

Method of use includes inserting the tip of the SAS within an introducer. The needle is next articulated, as needed, by moving a switch or control toggle to increase or decrease articulation. The jackscrew can comprise a high thread pitch such that a high mechanical advantage is provided so the motor drive power can be reduced as much as possible. This is especially easy with a motor drive because extra turns are easily and effortlessly accomplished, whereas manual turning of all those revolutions to move the thread would be cumbersome. The user could manually stop articulating as desired, reverse articulation, continue articulation, or the like. The amount of articulation can also be controlled by the user by inputting a tip deflection angle either directly or through an audio or computer interface. This system would provide for an easy, relatively inexpensive way to provide for manual user articulation with little effort, high-precision, and reasonable cost while retaining many features that would facilitate computer monitoring of the case.

In some embodiments, the control knob mechanism on the hub can be replaced by a gear or other linkage leading to a controller. A transmission system can be beneficially added to the system to provide for mechanical advantage. The controller can comprise a stepper motor, brushless dc motor, a standard brushed motor, pneumatic actuator, linear actuator, hydraulic actuator, or the like. The controller system can include a power supply such as a battery, a wiring bus, control electronics, and any associated power supply electronic components. The controller can be operatively connected to a control switch or dial, or it can be connected to a computer system, either onboard or remote from the SAS. The controller can be connected to a computer by methodology such as, but not limited to, wiring bus, Wi-fi, Bluetooth or other RF protocols, ultrasound, microwave, optical transmission, and the like. The computer can include devices such as, mainframes, laptops, tablet computers, cell phones, and the like. Thus, this system can be easily optimized for use in robotic surgery, robotic endovascular therapy, and the like. Monitoring of performance and position can be conducted by means such as, but not limited to, ultrasound, fluoroscopy, electromagnetic mapping, GPS positioning, and the like. Movement of the patient or even a target organ in the patient can be referenced to the location of the object to which the SAS is affixed by way of radiopaque markers and a fluoroscope (single or biplanar), a simple physical marker on the patient and cameras. The hub of the dilator, the hub of the sheath, and the hub of the SAS can be grasped by stabilizers, clamps, linear or rotational actuators, or other systems that permit stabilization and controlled movement. The stabilizers can be affixed or grounded relative to the catheterization lab walls, ceilings or floors, the operating table, the patient, or other reference points. Movement of each of these segments can be controlled in the axial and rotational directions. The hub can comprise controls such as those which adjust tip curvature and these control mechanisms, such as a control knob or gearbox, can be moved in a controllable fashion to generate robotic access to the patient in a transvascular capacity. An axial linear stage can be used to advance or retract the SAS and any concomitant introducers, catheters, etc. The distal tip of the SAS can be deflected in two orthogonal directions using orthogonally displaced internal control rods and keepers. Each direction can be separately actuated by controls at the proximal end of the SAS.

Figure 15:
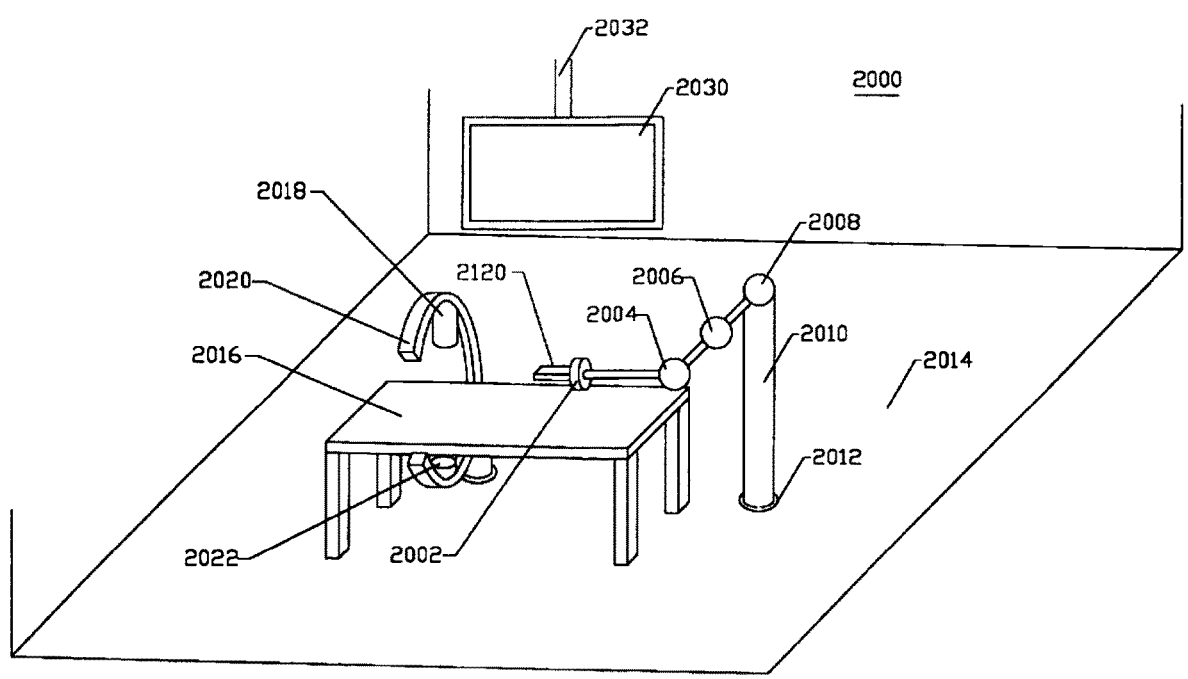
FIG. 15 illustrates a catheterization lab showing the Steerable Access System attached to the ceiling of the lab, according to an embodiment of the invention.

FIG. 15 illustrates a catheterization laboratory setup 2000 comprising an operating table 2016, a C-Arm fluoroscope system 2020 further comprising an x-ray emitter 2022 and an image intensifier 2018, one or more ultrasonic imaging systems (not shown), a multifunction display 2030 further comprising a room fixation system 2032, a floor 2014, a ceiling (not shown), and a robotic arm system comprising a room fixation feature 2012, a main stand 2010, a first joint 2008, a second joint 2006, a third joint 2004, and a rotary joint 2002, and further comprising a catheter handling head 2120.

Figure 16A:
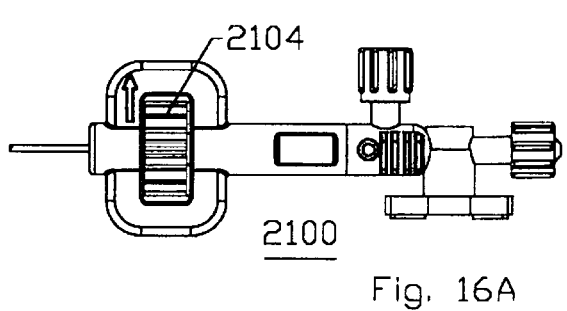
FIG. 16A illustrates a top view of a steerable catheter, transluminal device, or soft-tissue penetrating device hub comprising an articulation wheel that includes gears instead of surfaces to be grabbed by an operator, according to an embodiment of the invention.

FIG. 16A illustrates a side view of a catheter hub 2100 configured with a gear 2104 rather than a control knob. The gear 2104, in some embodiments, can be used to precisely move a jackscrew element, not shown, which can control tip deflection. Multiple gears can be used to generate curvature in multiple planes, axial locations, or both.

Figure 16B:
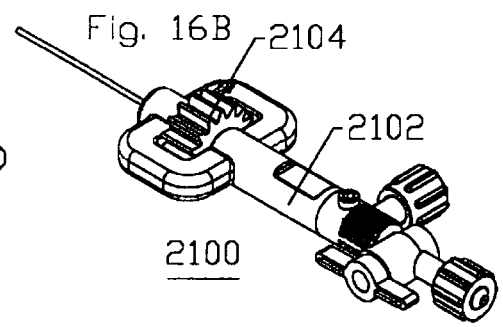
FIG. 16B illustrates an oblique view of the steerable catheter hub of FIG. 16A, according to an embodiment of the invention.

FIG. 16B illustrates an oblique view of the catheter head 2100 showing the hub body 2102 and the gear 2104.

Figure 16C:
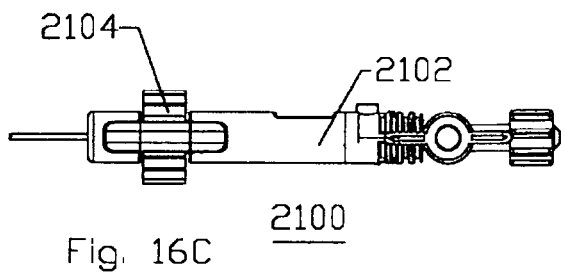
FIG. 16C illustrates a side view of the catheter hub of FIGS. 16A and 16B, according to an embodiment of the invention.

FIG. 16C illustrates a bottom view of the catheter hub 2100 comprising the hub body 2102 and the gear actuator 2104.

Figure 16D:
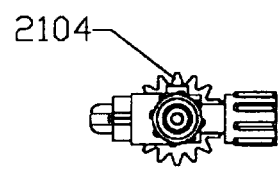
FIG. 16D illustrates a rear view of the catheter hub of FIGS. 16A, 16B, and 16C, according to an embodiment of the invention.

FIG. 16D illustrates a back view of the catheter hub 2100 further comprising the gear 2104.

Figure 16E:
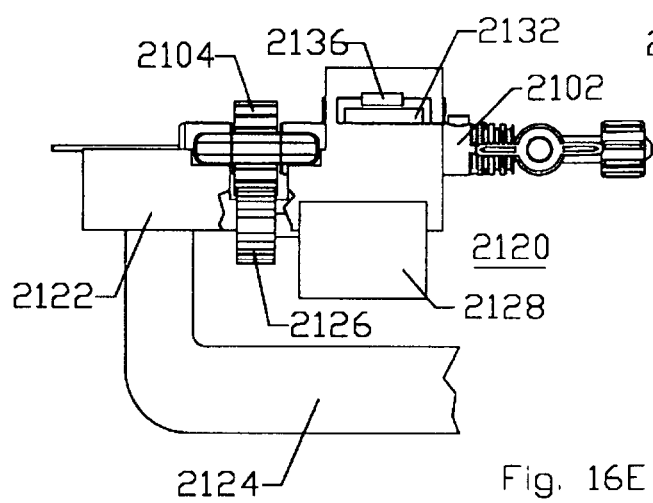
FIG. 16E illustrates a side view of a steerable catheter hub of FIG. 16C, comprising a receiver or locking cradle, affixed to the distal end of a robotic arm, capable of removable gripping the steerable catheter hub, and imparting motion in one or more axis to the catheter hub, according to an embodiment of the invention.
Figure 16F:
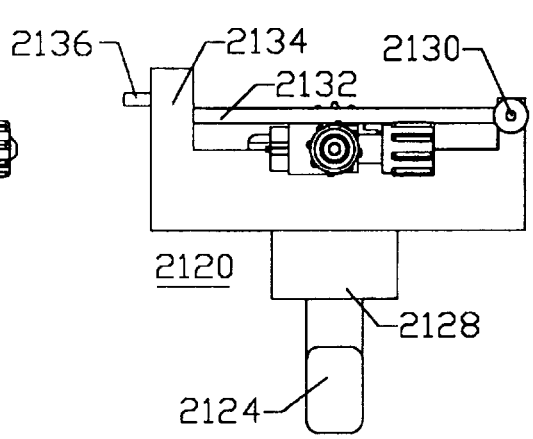
FIG. 16F illustrates a rear view of the steerable catheter hub of FIG. 16D and the cradle of FIG. 16E, according to an embodiment of the invention.

FIG. 16E illustrates a bottom view off a catheter handling head 21200 capable of grasping and manipulating a steerable access system or catheter 2100. The catheter handling head 2010 comprises a cradle 2102, locking mechanisms 2104 (not shown) to hold the hub of the SAS in the cradle 2102. The head 2010 also comprises one or more control motors 2106 for head rotation about its major axis, control motors 2108 for manipulation of the steering mechanism on the catheter or SAS, and mechanisms to affix the catheter handling head 2010 to the end of a robotic arm 2008.

The hub can be grasped by the cradle 2102, which can optionally comprise a releasable clamp or lock (not shown) with the ability to rotate the hub about its axis, advance or retract the hub (distally or proximally respectively), or dial in a specific amount of lateral tip deflection. The actuators can be in the form of a robotic arm, a stabilizer and clamp powered by electrical motors, stepper motors, pneumatic or hydraulic actuators, linear actuators, or the like. The actuator system can also control injection or withdrawal of fluids through the central lumen of the SAS as well as controlling the advancement and orientation of a guidewire or other central device. By the systems enclosed herein, a SAS, with or without a compatible introducer or catheter, can be introduced into a patient and robotically driven to any spot in the body, whether through vasculature or through tissue such as muscle, fat, organs, and the like. Provision can be made to allow for physician go-ahead or override at various points in the procedure.

The robotic control system can further comprise training features. For example, a database can be updated to require that axial forces greater than 0.5 pounds be exerted, that the torque applied can never be greater than 0.3 inch-pounds, that certain anatomies be traversed at a certain speed, that certain distal articulation be applied to traverse certain branches or curves, etc. The system can therefore be trained to include all the latest methodology available in the medical literature in a way that applies to the SAS. During a procedure, a different set of rules may be determined and those rule sets can be applied to future procedures using the same SAS or other SAS devices.

The robotic SAS system can receive a first sensor input set from a historical database, the sensor input comprising initial conditions and boundary conditions, for example. The access procedure can be initiated, wherein the system advances the endoluminal, or trans-solid tissue access instrument to a desired target location within the patient based at least in part on the first sensor input conditions. During the procedures, or based on external input, a second sensor input set can be input to the SAS database subsequent to starting the procedure. The advancement of the endoluminal access instrument, or SAS, can be adjusted based at least in part on the second sensor input. In some embodiments, should the procedure halt due to encountering out of bounds conditions, manual control of the device can be initiated such that a physician can manipulate the device to achieve the target, all the while with the position, speed, forces, etc. being monitored to provide data for further training.

The present invention may be embodied in other specific forms without departing from its spirit or essential characteristics. The described embodiments are to be considered in all respects only as illustrative and not restrictive. For example, the tip of the SAS can be rounded and blunt with a slit in the center. A cutter can be actuated, from the proximal end, for example, to project out beyond the round tip, to perform a slice while keeping the SAS dull and unlikely to puncture tissue or skive plastic off the inside of a dilator. The blade pushed out through the linear groove in the blunt tip can be operably connected to a linkage to provide reciprocating, side-to-side motion and cut a slit in the tissue that is wider than the diameter of the SAS. Control over forces applied to the hub, including relative force application to the inner and outer tubes and control rods and rotation of the system about its longitudinal axis can be controlled by electromechanical actuators and computerized controllers, or the like. The cutting element on the introducer dilator can operably connected to a vibratory transducer, operating in the range of about 0.1 Hz to about 50 kHz (well into the ultrasonic range), by way of a linkage from the transducer to the cutting blade, to provide for energy delivery to facilitate cutting of scarred or difficult to penetrate tissue. The cutting element can be configured to rotate by way of a linkage from a motor affixed to the hub such that an incision is created and then enlarged by the rotary system. In yet other embodiments, the tip of the access system can be configured to create an arc shaped slit, rather than a punch hole, wherein the total length of the arc is greater than the width of the tip of the access system, thus allowing easier tissue penetration than if a simple hole were punched in the tissue and then expanded. A slit in tissue has higher stresses at its ends, when expanded, thus permitting easier incision and passage of instrumentation through the hole than would be permitted with the dilated hole.

The method described above may be summarized as accessing a desired target location within a body lumen or vessel of a patient and performing therapeutic or diagnostic procedures at the desired location with the steps of providing an endoluminal access instrument comprising (1) an outer axially elongate hollow tube having a proximal end, a distal end, a longitudinal axis, a lumen extending therethrough, and at least one selectively bendable region, wherein the at least one selectively bendable region can transmit axial force, (2) an inner axially elongate tube divided, at least partially, axially, by a longitudinal slot, into at least one control rod (1106, FIG. 7) and a separated part (1108, FIG. 7) within the selectively bendable region of the outer axially elongate hollow tube, wherein the selectively bendable region of the outer axially elongate hollow tube and the longitudinal slot of the inner axially elongate tube establish a region of preferred bending in the endoluminal access instrument, and (3) a proximal end hub affixed to the proximal end of the outer axially elongate hollow tube and affixed to the proximal end of the inner axially elongate tube, wherein the inner axially elongate tube and the outer axially elongate hollow tube are affixed to each other distal to the at least one selectively bendable region; and performing an access procedure to the body lumen or vessel by inserting an endoluminal access instrument into a patient such that its distal end is positioned within the body lumen or vessel and its proximal end resides external to the patient, including the steps of fixing the proximal end hub of the endoluminal access instrument to a movable head of a robotic system and,

What is claimed is:

1. A method of accessing a desired target location within a body lumen or vessel of a patient and performing therapeutic or diagnostic procedures at the desired location, said method comprising the steps of:

performing an access procedure to the body lumen or vessel wherein an endoluminal access instrument is inserted into a patient such that its distal end is positioned within the body lumen or vessel and its proximal end resides external to the patient;

wherein the endoluminal access instrument comprises:

an outer axially elongate hollow tube having a proximal end, a distal end, a longitudinal axis, a lumen extending therethrough, and at least one selectively bendable region, wherein the at least one selectively bendable region can transmit axial force;

an inner axially elongate tube divided, at least partially, axially, by a longitudinal slot, into at least one control rod and a separated part within the selectively bendable region of the outer axially elongate hollow tube;

the selectively bendable region of the outer axially elongate hollow tube and the longitudinal slot of the inner axially elongate tube establish a region of preferred bending in the endoluminal access instrument;

a proximal end hub affixed to the proximal end of the outer axially elongate hollow tube and affixed to the proximal end of the inner axially elongate tube;

further wherein the inner axially elongate tube and the outer axially elongate hollow tube are affixed to each other distal to the at least one selectively bendable region;

and further comprising the steps of:

fixing the proximal end hub of the endoluminal access instrument to a movable head of a robotic system; and once the endovascular access instrument has reached the desired target location within the body lumen or vessel of a patient, performing therapeutic or diagnostic procedures.

2. The method of claim 1, wherein control over the position of the distal end of the endoluminal access instrument comprises hybrid control from both a computational system and a human operator.

3. The method of claim 1, wherein the robotic system receives a first sensor input set from a historical database, the first sensor input set comprising initial conditions and boundary conditions, the method further comprising the steps of;

starting the access procedure, wherein the system advances the endoluminal access instrument to the desired target location within the patient based at least in part on the initial conditions;

receiving second sensor input set subsequent to starting the access procedure; and adjusting the advancement of the endoluminal access instrument based at least in part on the second sensor input set.

4. The methods of claim 1 wherein the robotic system is capable of being trained to perform specific procedures with the benefit of rule-based or neural net algorithms.

* * * * *